(12) United States Patent
Brown et al.

(10) Patent No.: US 7,216,195 B1
(45) Date of Patent: May 8, 2007

(54) ARCHITECTURE FOR MANAGING DISK DRIVES

(75) Inventors: Jeffrey A. Brown, Shrewsbury, MA (US); Steven D. Sardella, Marlborough, MA (US); Ralph C. Frangioso, Jr., Franklin, MA (US); Mickey Steven Felton, Sterling, MA (US); Joseph P. King, Jr., Sterling, MA (US); Stephen E. Strickland, Marlboro, MA (US); Bernard Warnakulasooriya, Franklin, MA (US)

(73) Assignee: EMC Corporation, Hopkinton, MA (US)

( * ) Notice: Subject to any disclaimer, the term of this patent is extended or adjusted under 35 U.S.C. 154(b) by 593 days.

(21) Appl. No.: 10/402,363

(22) Filed: Mar. 29, 2003

(51) Int. Cl.
*G06F 13/00* (2006.01)

(52) U.S. Cl. .................. 710/316; 710/305; 710/306; 710/317; 326/125

(58) Field of Classification Search ........ 710/316–317, 710/305, 306; 326/125
See application file for complete search history.

(56) References Cited

U.S. PATENT DOCUMENTS

| | | | | |
|---|---|---|---|---|
| 4,135,240 A | * | 1/1979 | Ritchie | 711/164 |
| 4,682,088 A | * | 7/1987 | Sullivan | 318/568.1 |
| 4,787,082 A | * | 11/1988 | Delaney et al. | 370/216 |
| 4,808,855 A | * | 2/1989 | Lloyd | 326/86 |
| 5,699,533 A | * | 12/1997 | Sakai | 710/316 |
| 5,784,539 A | * | 7/1998 | Lenz | 706/45 |
| 5,982,753 A | * | 11/1999 | Pendleton et al. | 370/252 |
| 6,470,222 B1 | * | 10/2002 | Davidson et al. | 700/2 |
| 6,557,050 B1 | * | 4/2003 | Hamilton et al. | 710/19 |
| 6,600,739 B1 | * | 7/2003 | Evans et al. | 370/362 |
| 6,826,714 B2 | * | 11/2004 | Coffey et al. | 714/25 |
| 6,839,771 B1 | * | 1/2005 | Bouchier et al. | 709/253 |
| 6,854,045 B2 | * | 2/2005 | Ooi et al. | 711/202 |
| 6,874,055 B2 | * | 3/2005 | Chiang et al. | 710/316 |
| 2002/0032876 A1 | * | 3/2002 | Okagaki et al. | 713/300 |
| 2003/0154340 A1 | * | 8/2003 | Bolt et al. | 710/305 |
| 2005/0273585 A1 | * | 12/2005 | Leech | 713/1 |

OTHER PUBLICATIONS

Wolf, Axel. I2C (Inter-Integrated Circuit) Bus Technical Overview and Frequently Asked Questions (FAQ. 2000. http://www.esacademy.com/faq/i2c/index.htm.*
Dictionary.com. "transistor" http://dictionary.reference.com/browse/transistor.*
Rave Systems. Rackmount 2U AX1105 User Manual. 2002. Rave Computer Association, Inc.*
EMC Corporation. EMC Fibre Channel Disk Array Enclosure (DAE) Rackmount Model. User Manual. Oct. 2000.*
Adaptec, Inc. RAIDstation RS/7F Kit Fibre Channel Storage Arrays. User Manual. Jan. 2001.*

* cited by examiner

*Primary Examiner*—Gopal C. Ray
*Assistant Examiner*—Matthew Spittle
(74) *Attorney, Agent, or Firm*—Bainwood Huang

(57) ABSTRACT

Disclosed are ways of providing a highly flexible high availability storage system. Disk drive carriers for insertion into enclosures in a storage system include several disk drives. The enclosures accept carriers that include drives of different sizes, and drives compatible with different storage technologies, for instance Fibre Channel, SATA, or SAS. Drives oriented in their carriers in a manner that allows them to be connected to a common medium via identical flex circuits that are configured based on the orientation of the drives. Redundant controllers include redundant serial buses for transferring management information to the carriers. The carriers include a controller for monitoring the multiple serial buses and producing storage technology specific management commands for the disk drives.

4 Claims, 27 Drawing Sheets

| 106 INITIALIZATION | iLCC ID (A/B) | RESERVED | SPEED(2) | SPEED(1) | SPEED(0) | OP CODE(2) | OP CODE(1) | OP CODE(0) | LOOP ID | ENCLSRE ID(2) | ENCLSRE ID(1) | ENCLSRE ID(0) | SLOT ID(3) | SLOT ID(2) | SLOT ID(1) | SLOT ID(0) |
|---|---|---|---|---|---|---|---|---|---|---|---|---|---|---|---|---|
|  | 0/1 | 0 | 0 | 0 | 0 | 0 | 0 | 0 | 0/1 | 0 | 0 | 0 | 0 | 0 | 0 | 0 |

| 108 COMMAND REGISTER | iLCC ID (A/B) | RESERVED | RESERVED | RESERVED | RESERVED | OP CODE(2) | OP CODE(1) | OP CODE(0) | RESERVED | RESERVED | RESERVED | RESERVED | RESERVED | RESERVED | DRIVE 1 | DRIVE 0 |
|---|---|---|---|---|---|---|---|---|---|---|---|---|---|---|---|---|
| POWER ON DRIVE 0 | 0/1 | 0 | 0 | 0 | 0 | 0 | 0 | 1 | 0 | 0 | 0 | 0 | 0 | 0 | 0 | 0 |
| POWER ON DRIVE 1 | 0/1 | 0 | 0 | 0 | 0 | 0 | 0 | 1 | 0 | 0 | 0 | 0 | 0 | 0 | 0 | 1 |
| POWER ON BOTH | 0/1 | 0 | 0 | 0 | 0 | 0 | 0 | 1 | 0 | 0 | 0 | 0 | 0 | 0 | 1 | 1 |
| POWER OFF DRIVE 0 | 0/1 | 0 | 0 | 0 | 0 | 0 | 1 | 0 | 0 | 0 | 0 | 0 | 0 | 0 | 0 | 0 |
| POWER OFF DRIVE 1 | 0/1 | 0 | 0 | 0 | 0 | 0 | 1 | 0 | 0 | 0 | 0 | 0 | 0 | 0 | 0 | 1 |
| POWER OFF BOTH | 0/1 | 0 | 0 | 0 | 0 | 0 | 1 | 0 | 0 | 0 | 0 | 0 | 0 | 0 | 1 | 1 |
| POWER CYCLE DRIVE 0 | 0/1 | 0 | 0 | 0 | 0 | 0 | 1 | 1 | 0 | 0 | 0 | 0 | 0 | 0 | 0 | 0 |
| POWER CYCLE DRIVE 1 | 0/1 | 0 | 0 | 0 | 0 | 0 | 1 | 1 | 0 | 0 | 0 | 0 | 0 | 0 | 0 | 1 |
| POWER CYCLE BOTH | 0/1 | 0 | 0 | 0 | 0 | 0 | 1 | 1 | 0 | 0 | 0 | 0 | 0 | 0 | 1 | 1 |
| HARD RESET DRIVE 0 | 0/1 | 0 | 0 | 0 | 0 | 1 | 0 | 0 | 0 | 0 | 0 | 0 | 0 | 0 | 0 | 0 |
| HARD RESET DRIVE 1 | 0/1 | 0 | 0 | 0 | 0 | 1 | 0 | 0 | 0 | 0 | 0 | 0 | 0 | 0 | 0 | 1 |
| HARD RESET BOTH | 0/1 | 0 | 0 | 0 | 0 | 1 | 0 | 0 | 0 | 0 | 0 | 0 | 0 | 0 | 1 | 1 |

| Command | iLCC ID | | | | | OP(2) | OP(1) | OP(0) | DEV_CTL_CODE(2) | DEV_CTL_CODE(1) | DEV_CTL_CODE(0) | | | | |
|---|---|---|---|---|---|---|---|---|---|---|---|---|---|---|---|
| CHANGE LOOP SPEED DRIVE 0 | 0/1 | 0 | 0 | 0 | 0 | 1 | 0 | 1 | New Speed | 0 | 0 | 0 | 0 | 0 | | |
| CHANGE LOOP SPEED DRIVE 1 | 0/1 | 0 | 0 | 0 | 0 | 1 | 0 | 1 | New Speed | 0 | 0 | 0 | 0 | 1 | | |
| CHANGE LOOP SPEED BOTH | 0/1 | 0 | 0 | 0 | 0 | 1 | 0 | 1 | New Speed | 0 | 0 | 0 | 1 | 1 | | |
| BLOCK OTHER ILCC | 0/1 | 0 | 0 | 0 | 0 | 1 | 1 | 0 | 0 | 0 | 0 | 0 | 0 | 0 | | |
| UNBLOCK OTHER ILCC | 0/1 | 0 | 0 | 0 | 0 | 1 | 1 | 0 | 0 | 0 | 0 | 1 | 1 | 1 | | |
| READ STATUS REGS | 0/1 | 0 | 0 | 0 | 0 | 1 | 1 | 1 | Reg address | | | | | | | |
| CLEAR COMMAND REG | 0/1 | 0 | 0 | 0 | 1 | 0 | 0 | 0 | Reg address | | | | | | | |

FIG. 14A

110
DRIVE STATUS REGISTERS

| DRIVE 0 STATUS REG 00h | | DRIVE 1 STATUS REG 01h | |
|---|---|---|---|
| D0_INS_N | | D1_INS_N | |
| D0_FAULT_N | | D1_FAULT_N | |
| D0_PWR_DN_N | | D1_PWR_DN_N | |
| D0_START_(1) | | D1_START_(1) | |
| D0_START_(0) | | D1_START_(0) | |
| D0_DEV_CTL_CODE(2) | | D1_DEV_CTL_CODE(2) | |
| D0_DEV_CTL_CODE(1) | | D1_DEV_CTL_CODE(1) | |
| D0_DEV_CTL_CODE(0) | | D1_DEV_CTL_CODE(0) | |

REG 02h - 05h
RESERVED

| DRIVE 0 SEL ID REG 06h | | DRIVE 1 SEL ID REG 07h | |
|---|---|---|---|
| RESERVED | | RESERVED | |
| D0_SEL_ID(6...0) | | D1_SEL_ID(6...0) | |

REG 08h - 0Bh
RESERVED

112
COMMAND STATUS REGISTERS

| HARD RESET COMMAND STATUS REG 0Ch | | POWER CONTROL COMMAND STATUS REG 0Dh | |
|---|---|---|---|
| RESERVED | | !CLEARED | |
| RESERVED | | COMMAND_SUCCESS | |
| !CLEARED | | POWER_STATUS(1) | |
| COMMAND_SUCCESS | | POWER_STATUS(0) | |
| ISSUED_BY_iLLC | | ISSUED_BY_iLLC | |
| ISSUED_TO_DRIVE(2) | | ISSUED_TO_DRIVE(2) | |
| ISSUED_TO_DRIVE(1) | | ISSUED_TO_DRIVE(1) | |
| ISSUED_TO_DRIVE(0) | | ISSUED_TO_DRIVE(0) | |

FIG. 14B

EACH MIDPLANE / LCC CONNECTOR PINOUT

| | VHDM | VHDM | VHDM | VHDM | VHDM |
|---|---|---|---|---|---|
| LCC ONLY | GND | GND | GND | CARRIER Ins_n | RESET |
| LCC ONLY | Tx0_FC+ | Rx0_FC+ | Tx1_FC+ | Rx1_FC+ | INTR |
| LCC ONLY | Tx0_FC- | Rx0_FC- | Tx1_FC- | Rx1_FC- | 12C DATA |
| LCC ONLY | GND | GND | GND | GND | 12C CLK |
| LCC ONLY | SPARE | SPARE | GND | FAULT | SPARE |
| LCC ONLY | BYPASS 0(A/B) | BYPASS 1(A/B) | 12V | 12V | SPARE_V |

EACH MIDPLANE / LCC CONNECTOR PINOUT

| | VHDM | VHDM | VHDM | VHDM | VHDM |
|---|---|---|---|---|---|
| LCC ONLY | GND | GND | GND | CARRIER Ins_n | RESET |
| LCC ONLY | Tx0_SATA+ | RX0_SATA+ | TX1_SATA+ | RX1_SATA+ | INTR |
| LCC ONLY | Tx0_SATA- | RX0_SATA- | TX1_SATA- | RX1_SATA- | 12C DATA |
| LCC ONLY | GND | GND | GND | GND | 12C CLK |
| LCC ONLY | REQ0(A/B) | REQ1(A/B) | GND | FAULT_n | SPARE |
| LCC ONLY | GNT0(A/B) | GNT1(A/B) | 12V | 12V | 5V |

FIG. 16

ARCHITECTURE FOR MANAGING DISK DRIVES

CROSS-REFERENCE TO RELATED APPLICATIONS

This patent application may be related to the following commonly-owned United States patent application, which is incorporated in its entirety by reference:

U.S. patent application entitled MIDPLANE-INDEPENDENT IMPLEMENTATIONS OF DATA STORAGE SYSTEM ENCLOSURES, Ser. No. 10/402,594 by Felton, filed Mar. 28, 2003.

FIELD OF THE INVENTION

The present invention relates generally to storage systems, and more particularly to a flexible architecture for providing a very large capacity, highly available storage system

BACKGROUND OF THE INVENTION

As storage technology improves, disk drives continue to become smaller and denser. In addition, various different disk drive storage technologies exist, for example Fibre Channel and SATA. Storage systems therefore continue to be re-designed in order to take advantage of the small, denser drives to provide systems offering larger amounts of storage space. Storage systems are also storage technology dependent, so different systems must be designed depending upon the disk drive technology used.

Disk drive densities have been rapidly increasing, but density increases are now slowing as technology limits are approached. Storage systems designers cannot therefore simply rely on density increases in order to provide increased storage space. Designers will need to find other means of increasing storage space.

In the meantime, for most uses to which such storage systems are put, it is very important that they be highly reliable so that critical data is not lost. "Highly available" storage systems are provided for this reason. High availability is provided, for example, by duplicating data across disks, and by making sure that cached data can be written back to disks in the event of a failure.

It would be advantageous to provide a storage system architected to take advantage of various different types of disk drive technologies and densities, and architected in a highly available manner.

SUMMARY OF THE INVENTION

In accordance with the principles of the invention, innovative apparatus and methods are employed to provide a highly flexible high availability storage system.

In accordance with one aspect of the invention, a storage system includes a plurality of active disk drives and a plurality of spare disk drives. A logical unit of data is spread across a plurality of the active disk drives. If an active disk drive in the logical unit fails, an area is allocated on a spare disk drive for the logical unit of data, and the logical unit of data is rebuilt so that the allocated area on the spare disk drive is now part of the logical unit of data. Furthermore, the amount of spare disk drive area is tracked, an indication is generated when the amount of spare disk drive area falls below a threshold.

According to further aspects of the invention, a storage system includes a first link control card coupled to a plurality of disk drive carriers, and a second link control card coupled to the plurality of disk drive carriers. A first plurality of serial buses on the first link control card is input to a first plurality of serial bus controllers. The first plurality of serial bus controllers produces as output a first plurality of output serial buses. The first plurality of output serial buses is input to a first switch, the first switch producing as output a first LCC serial bus. Similarly, a second plurality of serial buses on the second link control card is input to a second plurality of serial bus controllers. The second plurality of serial bus controllers produce as output a second plurality of output serial buses. The second plurality of output serial buses is input to a second switch, the second switch producing as output a second LCC serial bus. The first and second LCC serial buses are coupled to a serial bus controller on each disk drive carrier. The serial bus controller on the carrier produces as output storage technology specific management signals for managing disk drives. The storage technology specific management signals may be for example SFF 8067 management signals for Fibre Channel disk drives, or they may be SATA management signals for SATA disk drives.

According to a particular embodiment, the first and second LCC serial buses are wire-ored together within the serial bus controller to produce a wire-ored serial bus, and serial bus controller can drive the first and second LCC serial buses at the same time. Serial bus controller monitors the first and second LCC serial buses, and if either LCC serial bus is ascertained to be non-functional, the software serial bus controller isolates the non-functional LCC serial bus so that wire-ored serial bus remains functional. In addition, the serial bus controller accepts as input from the first link control card a first reset signal, accepts as input from the second link control card a second reset signal. The serial bus controller monitors the first and second reset signals, and if either reset signal remains asserted for beyond a threshold period of time, the serial bus controller ignores the asserted reset signal. All these mechanisms provide high availability of the storage system.

BRIEF DESCRIPTION OF THE DRAWINGS

In order to facilitate a fuller understanding of the present invention, reference is now made to the appended drawings. These drawings should not be construed as limiting the present invention, but are intended to be exemplary only.

FIG. 14A–C are representations of registers within the microcontroller on the circuit board of FIG. 13.

FIG. 16 is a representation showing the midplane connector pinout for both FC and SATA configurations.

DETAILED DESCRIPTION OF EXEMPLARY EMBODIMENTS

Figure 1:
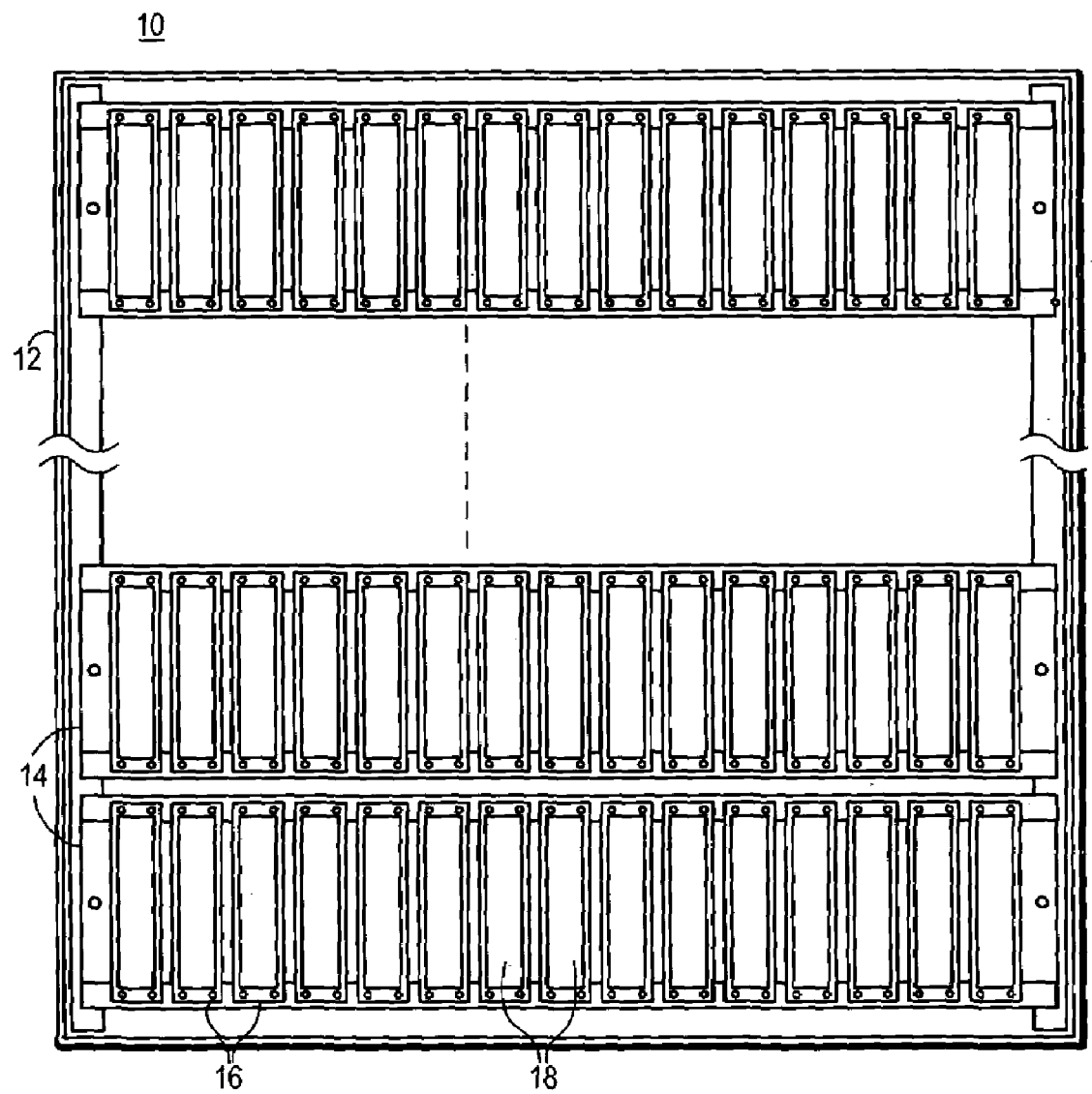
FIG. 1 is a representation of a rack mount system including several storage enclosures.
Figure 2A:
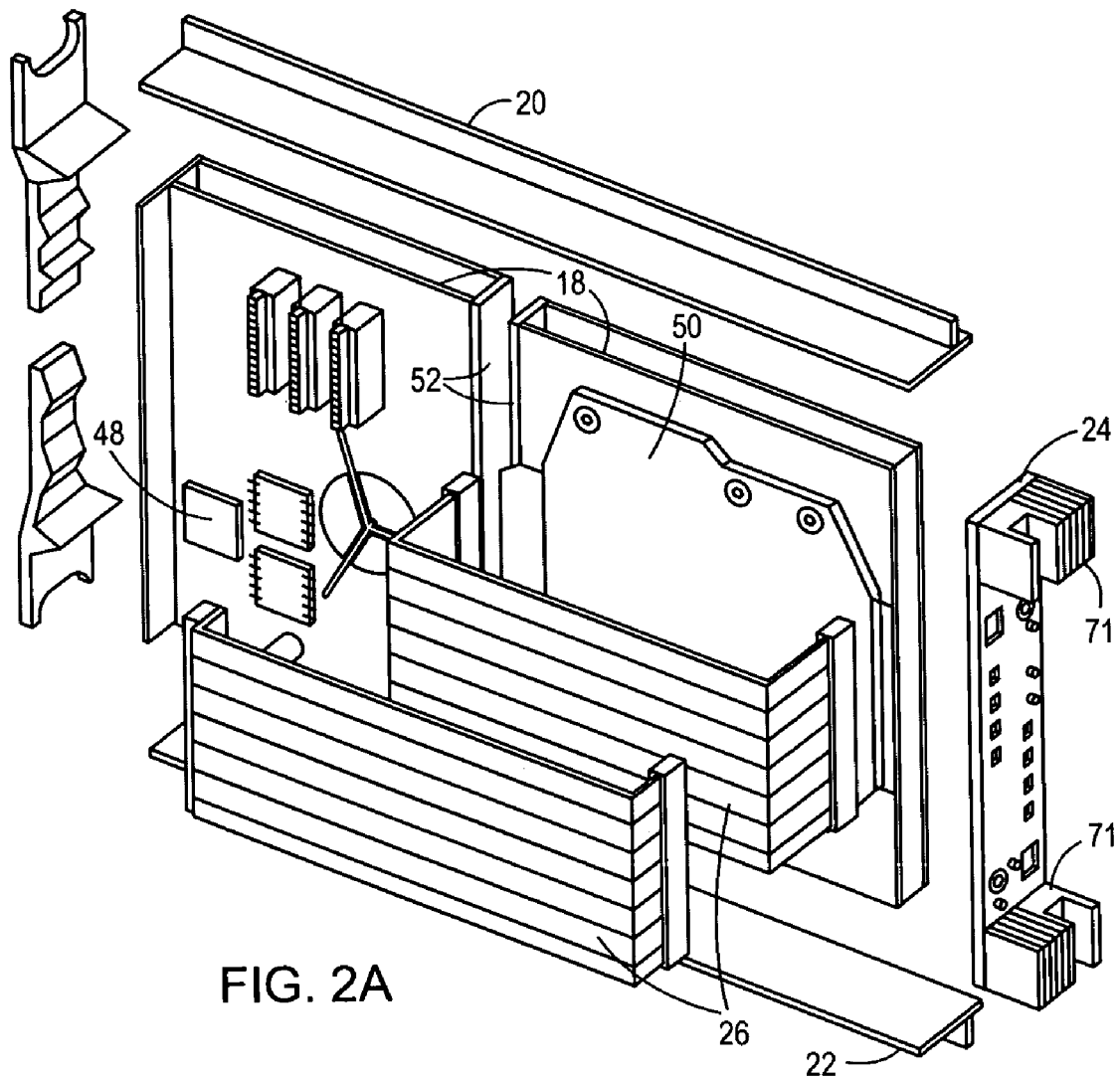
FIG. 2A is an exploded view of a carrier that contains two 3.5 inch disk drives in accordance with the principles of the invention.
Figure 2B:
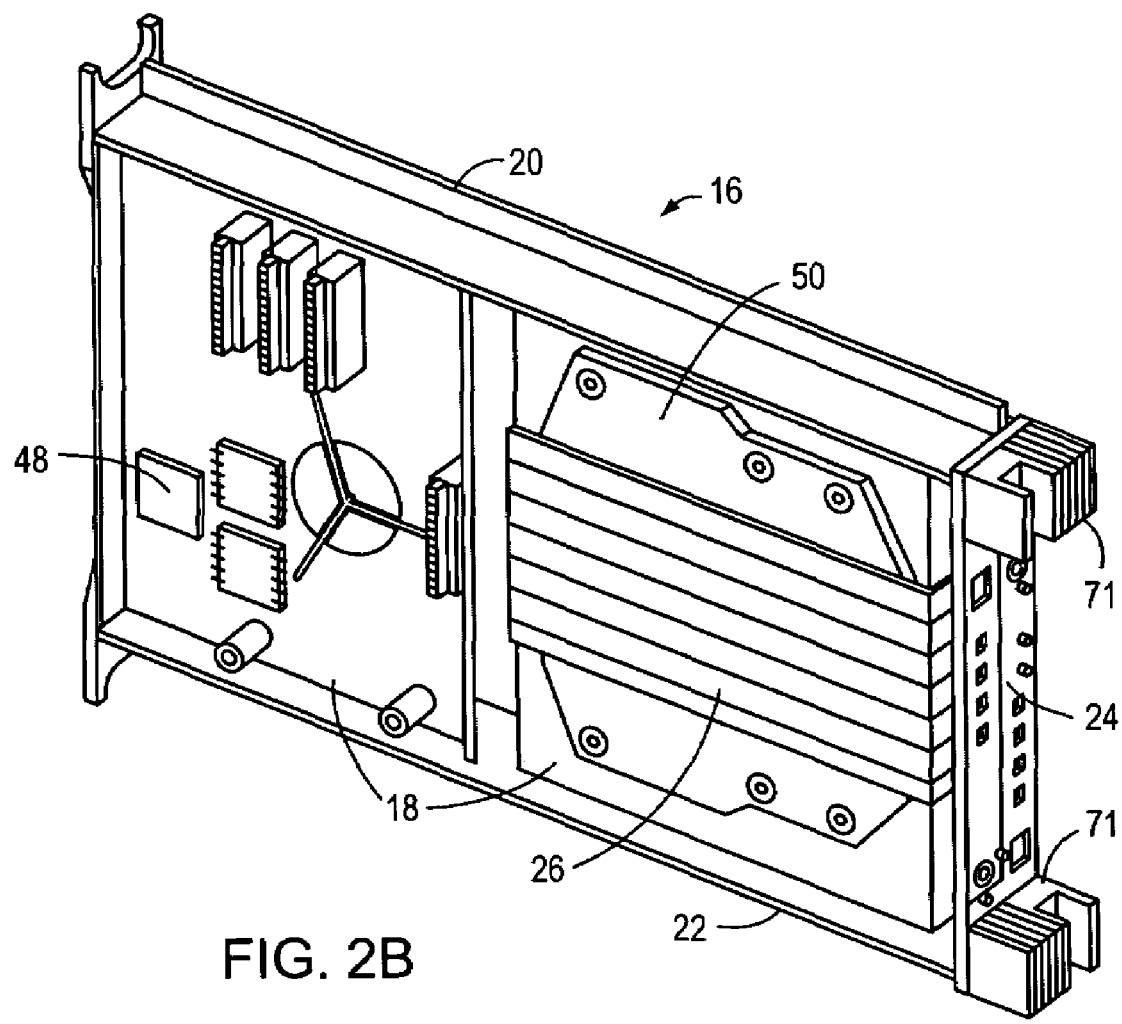
FIG. 2B is an assembled view of the carrier of FIG. 2A.
Figure 3A:
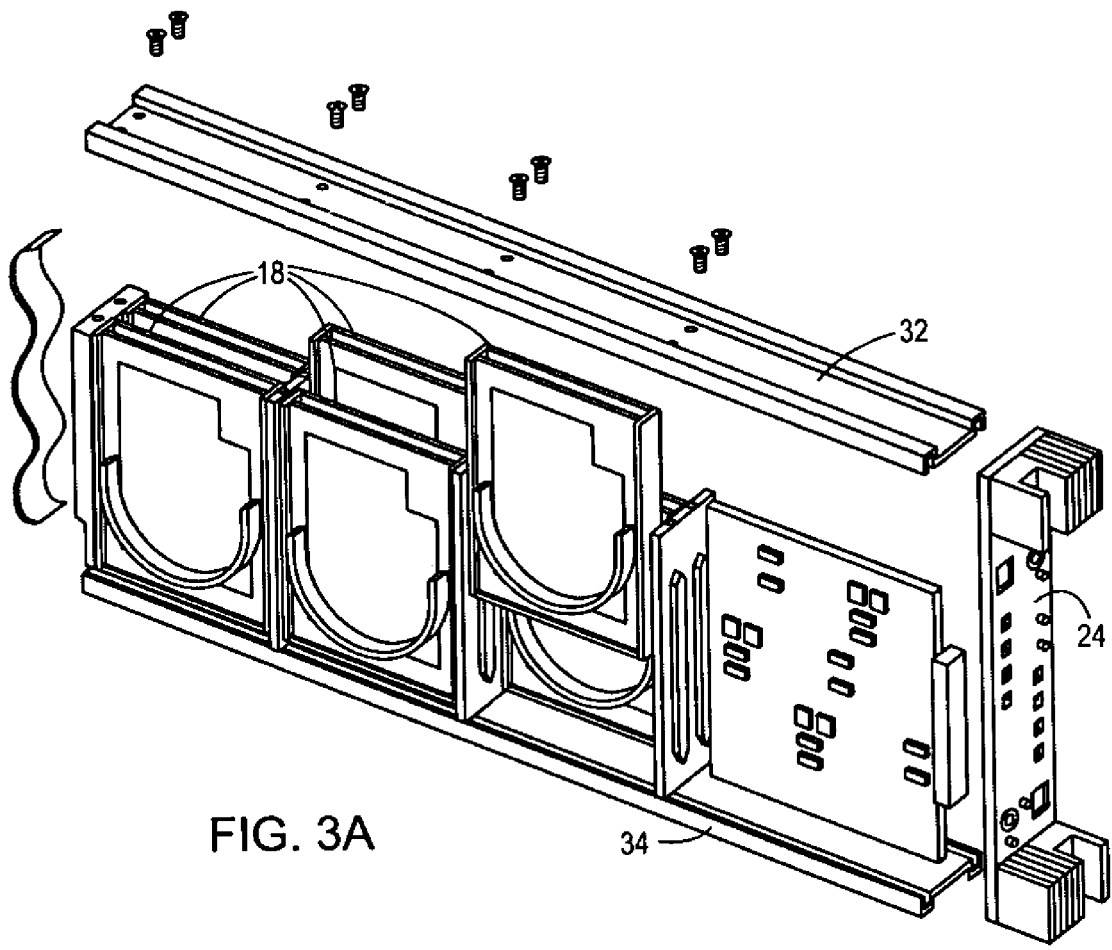
FIG. 3A is an exploded view of a carrier that contains six 2.5 inch disk drives in accordance with the principles of the invention.
Figure 3B:
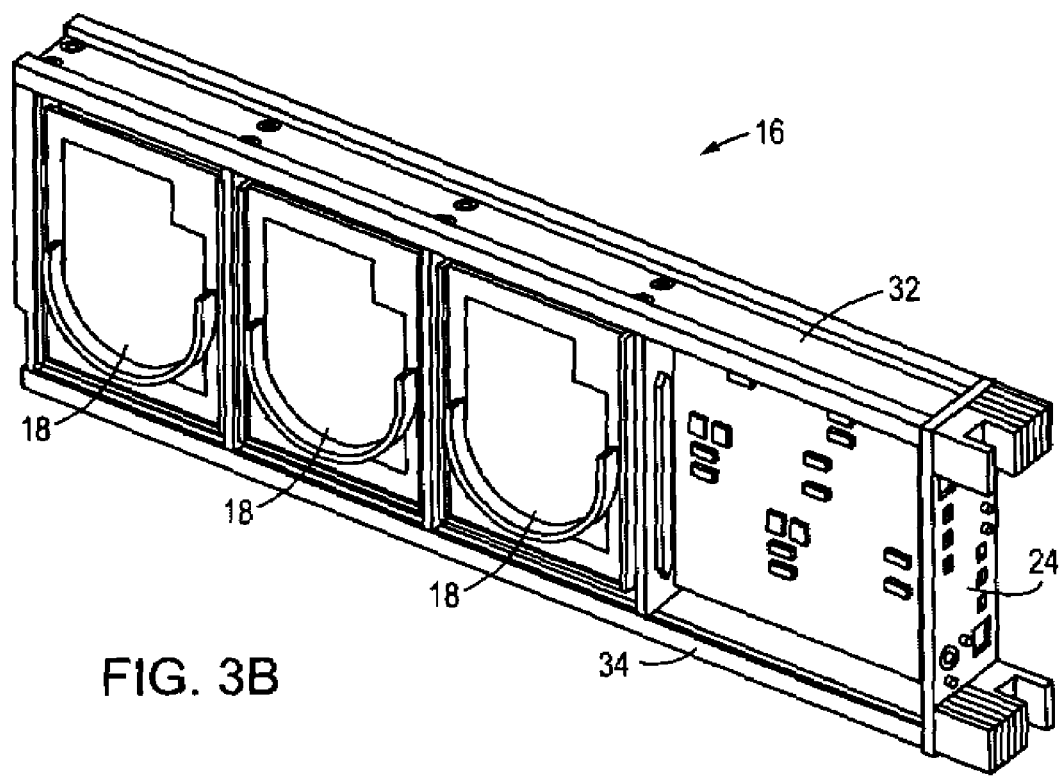
FIG. 3B is an assembled view of the carrier of FIG. 3A.

Referring to FIG. 1, there is shown an example of a storage system 10 in which the present invention may be employed. A rack mount cabinet 12 includes several storage enclosures 14. Each storage enclosure 14 is preferably an EIA RS-310C 3U standard rack mount unit. In accordance with the principles of the invention, each storage enclosure 14 has installed therein several disk drive carriers 16, each carrier 16 including several disk drives 18. In FIGS. 2A and 2B and 3A and 3B there are shown preferred embodiments of the disk drive carriers 16. A carrier 16 may include two 3.5 inch disk drives 18 as shown in FIGS. 2A and 2B. Or, a different carrier 16 may include six 2.5 inch disk drives 18, as shown in FIGS. 3A and 3B. Further in accordance with the principles of the invention, the disk drives 18 may be compatible with any low voltage differential signaling (LVDS) storage technology. For example, the disk drives 18 may be Fibre Channel disk drives, or they may be Serial Advanced Technology Attachment (SATA) disk drives, or they may be Serial Attached SCSI (SAS) disk drives. Though serial channel technologies are preferred, the invention does not preclude the use of parallel technology. A highly flexible storage system architecture is thereby provided, wherein the architecture is independent of disk size and technology. Thus, as disk sizes decrease, capacities increase, and new storage technologies emerge, the same storage system chassis and architecture can be used with the new disks. Furthermore, because each carrier 16 is capable of including several disk drives, very large amounts of storage space are provided. In the embodiment shown, each storage enclosure 14 is capable of supporting fifteen carriers 16, and up to eight enclosures 14 can be included in a rack mount system 10. If two 3.5 inch disk drives are included per carrier, a system 10 can include 240 drives 18. If six 2.5 inch disk drives are included per carrier, a system 10 can include 720 drives 18. Several systems 10 can be cascaded to provide petabytes of storage space. This embodiment is shown by way of example only, as the invention is not limited to any particular number of disk drives, carriers, or enclosures.

Figure 6A:
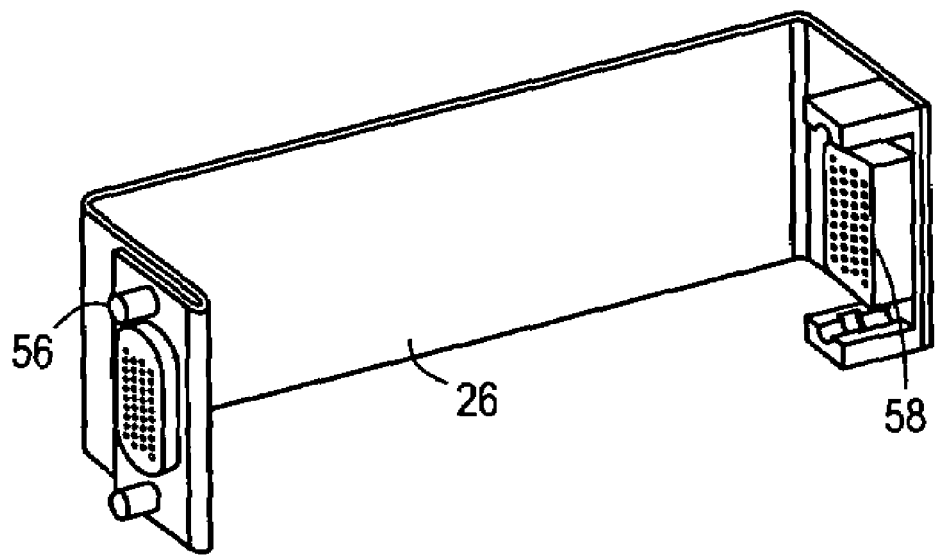
FIGS. 6A and 6B are perspective views of the different flex circuit configurations that can be achieved based on how the bend lines are used.
Figure 6B:
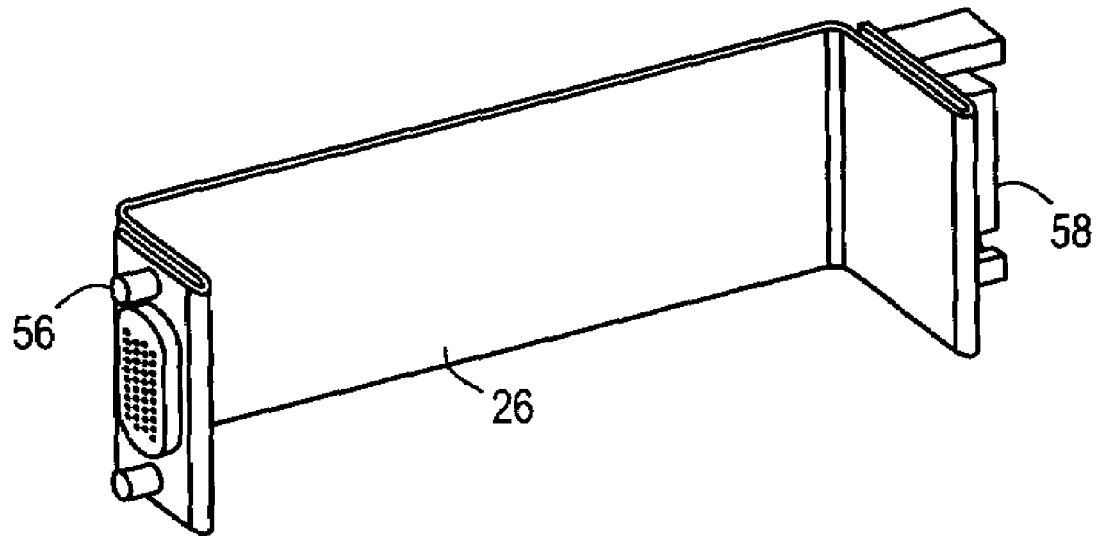

More particularly, referring to FIG. 2A, in accordance with a first embodiment two 3.5 inch disk drives 18 are installed horizontally within the carrier 16 between a top rail 20 and a bottom rail 22. A circuit board 24, herein referred to as a paddle board, connects the drives 18 to a midplane (shown in FIG. 6) via two flex cables 26.

Referring to FIG. 3A, in accordance with a second embodiment six 2.5 inch disk drives are installed vertically between a top rail 32 and a bottom rail 34. Three drives 18 are installed on one side of the carrier 16, while the other three drives 18 are installed on the other side of the carrier 16, back-to-back with the first three. As in the embodiment of FIG. 2, a paddle board 24 connects the drives 18 to the midplane 38.

Figure 4A:
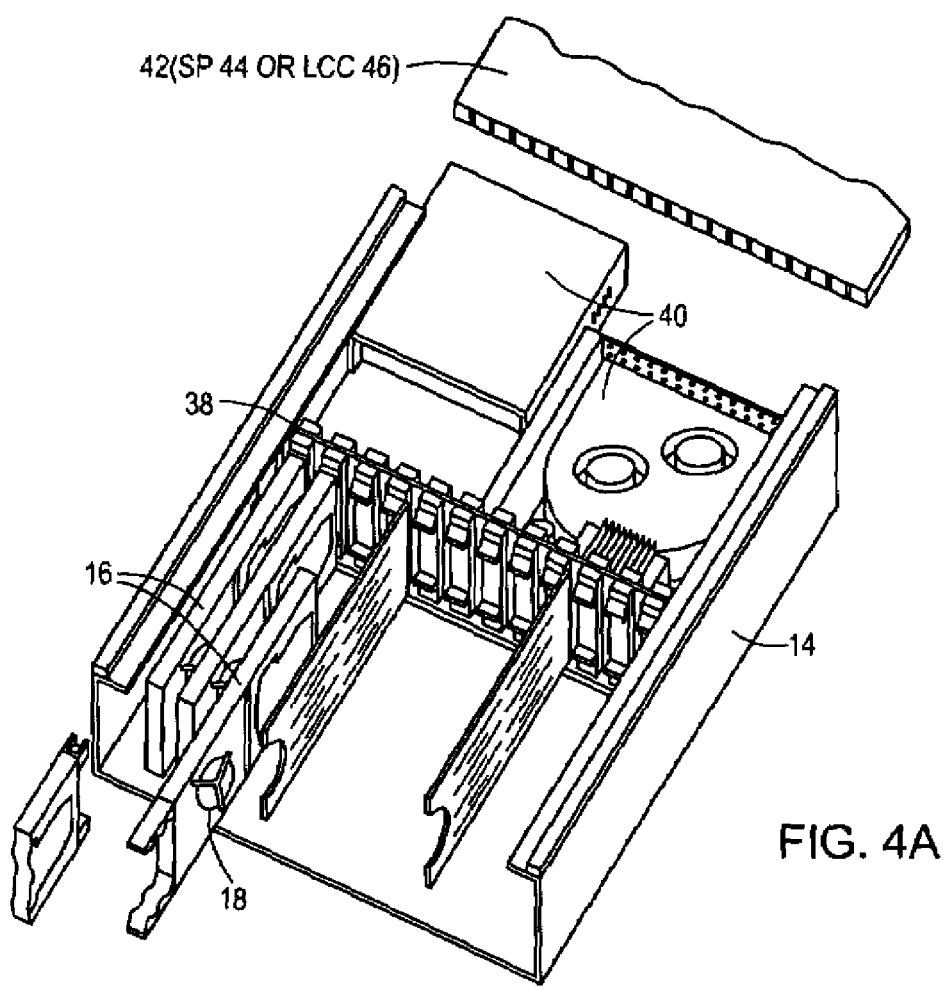
FIGS. 4A and 4B are front and rear views of the disk drive enclosures of FIG. 1.
Figure 4B:
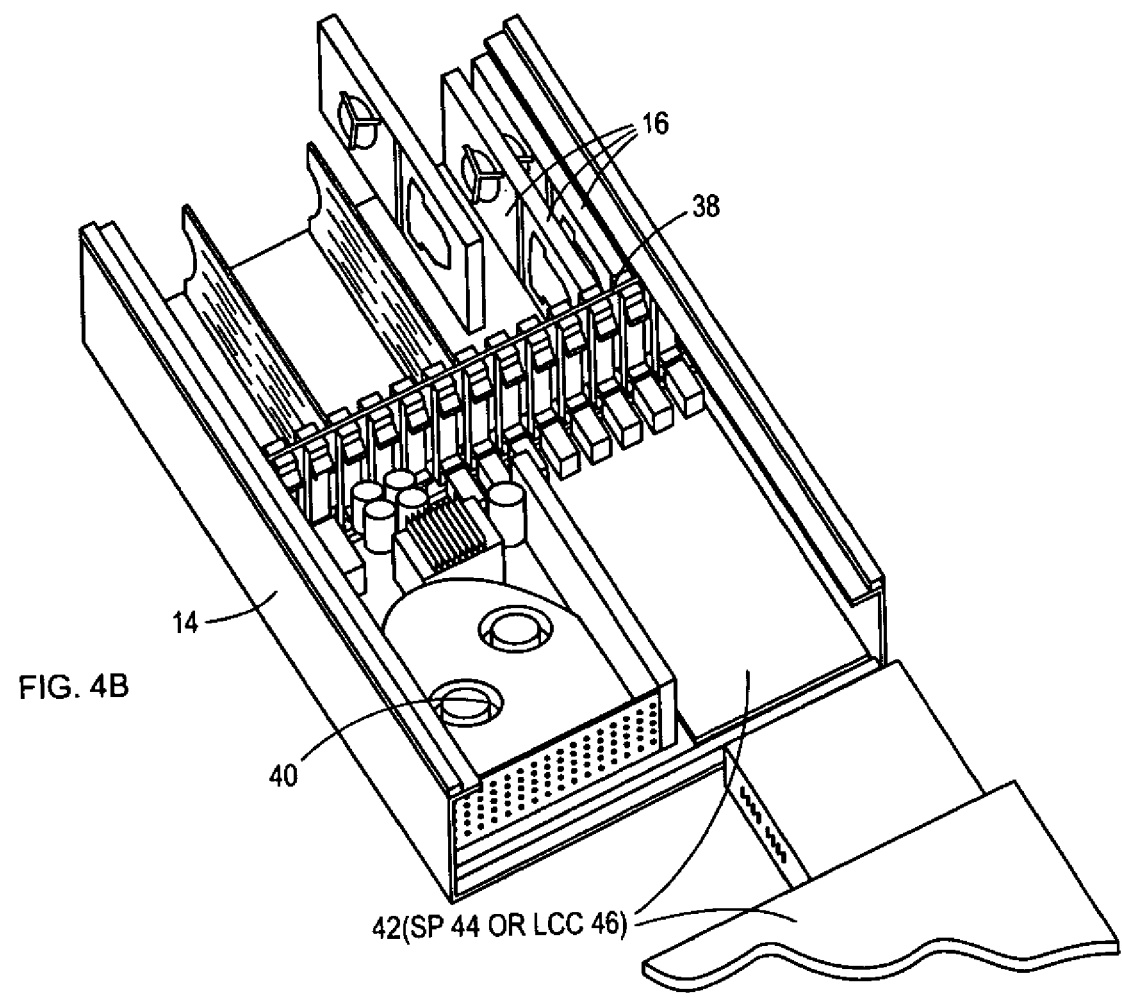

In FIGS. 4A and 4B there are shown front and rear views of the enclosure 14 respectively. The carriers 16 slide into the front of the enclosure 14 to connect to a midplane 38. Two power supplies 40 and two circuit boards 42 reside in the back of the enclosure 14, and are coupled to the carriers 16 via the midplane 38. The circuit boards 42 reside above and below the power supplies 40. The circuit boards 42 may be either storage processors 44 (SPs) or link control cards 46 (LCCs). Typically, one of the enclosures 14 in the system contains SPs 44, which provide certain system control functions. The rest of the enclosure 14 contain LCCs 46. The LCCs 46 serve to interconnect the disks 18 and enclosures 14 onto the chosen channel technology. The embodiment herein shown includes fifteen drive carriers 16, though more or fewer could be included without departing from the principles of the invention. Data and management signals cross the midplane 38 between the SPs 44 or LCCs 46 and the drives 18. The signals that cross the midplane 38 are storage technology agnostic—that is, they are not dependent upon whether the installed drives are for example fibre channel (FC), or SATA, or SAS, etc. According to one embodiment, the LCCs 46 interconnect the disk drives 18 and enclosures 14 on a Fibre Channel Arbitrated Loop (FC-AL). According to another embodiment, the LCCs 46 interconnect the drives 18 and enclosures 14 onto a SATA channel. According to a third embodiment, the LCCs 46 interconnect the drives 18 and enclosures 14 onto a SAS channel.

In an alternate embodiment, the carriers 16 are directly connected to the SPs 44 or LCCs 46 such that the midplane 38 is not required.

The system 10 shown in FIG. 1 is a Highly Available storage system. Therefore, two power supplies 40, and two SPs 44 or LCCs 46 are provided in each enclosure 14 for fault tolerant purposes. Other inventive steps are taken throughout the system 10 to support high availability, as will be further described.

As previously described, in one embodiment the drive carrier 16 can house two disk drives 18. Referring back to FIG. 2, in accordance with an aspect of the invention, the two disk drives 18 are oriented in opposite directions. In the example shown, the disk drive 18 closest to the paddle board 24 is oriented such that its component side 48 is on the right (not visible), its HDA cover plate 50 is on the left, and its connector 52 faces the rear. The other drive 18 is oriented such that its component side 48 is on the left, its HDA cover plate 50 is on the right (not visible), and its connector 52 faces the paddle board 24. This orientation is highly advantageous when connecting the drives 18 to the paddle board 24 via flex cables 26. Because of the orientation of the disk drives 18 within the carrier 16, the same flex cables can be used to connect both drives to the paddle board 24. Note that, were the drives 18 not oriented as shown, the flex cables 26 would need to be of different lengths. But because of the shown drive orientation, the flex cables 26 are of the same length and connector configuration. This is highly advantageous in a production environment, because only one part number needs to be ordered and spared, and reduction in part numbers reduces the overall cost of the system. It is also advantageous in that consistent signal quality is provided for the high speed signals because all the signals are the same length. Furthermore, this aspect of the invention can be broadly applied in any system wherein multiple devices are plugged into the same bus or channel. For example, the invention could be applied to a carrier including multiple flash memory modules, or multiple CD drives, etc.

Figure 5A:
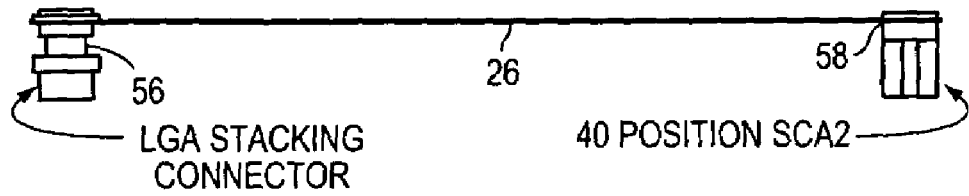
FIGS. 5A–5D are various views of a flex circuit showing bend lines.
Figure 5B:
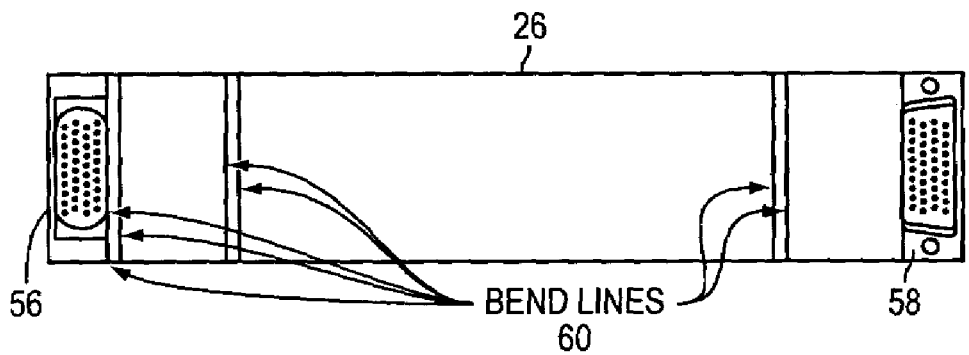
Figure 5C:
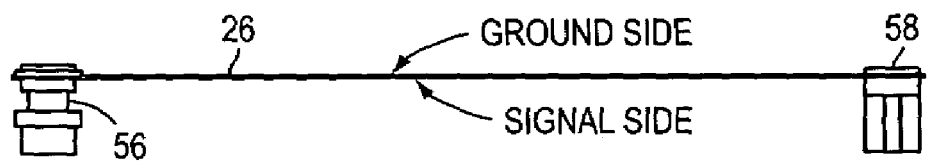
Figure 5D:
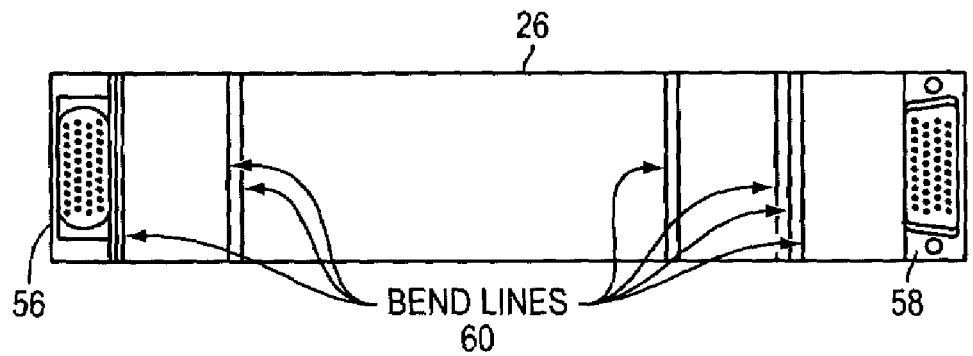

More particularly, the flex circuit 26 is configured into an arrangement that depends upon which drive 18 the flex circuit 26 is connected to. As shown in FIG. 5, the flex circuit 26 includes an LGA stacking connector 56 on one end for connecting the flex circuit 26 to the paddle board 24. The flex circuit 26 includes an SCA2 connector 58 at the opposite end for connecting the flex circuit 26 to a disk drive 18. The flex circuit 26 includes multiple bend lines 60. If the flex circuit is to be connected to the drive 18 closest to the midplane 38, it is bent at the bend lines 60 as shown in FIG. 5B to produce the configuration shown in FIG. 6A, wherein the SCA2 connector 58 faces the front drive connector. If the flex circuit 26 is to be connected to the drive 18 farthest from the midplane 38, it is bent at the bend lines 60 as shown in FIG. 5D to produce the configuration shown in FIG. 6B, wherein the SCA2 connector 58 faces the rear drive connector, and the LGA stacking connector 56 fits next to the LGA stacking connector 56 on the other flex cable 26.

In accordance with a further aspect of the invention, referring back to FIG. 2B, the flex circuits 26 traverse the front disk drivel 8 along the HDA cover plate 50 of the disk drive 18. This provides several advantages. First of all, if the flex circuits 26 were to be run across the component side 42 of the drive, the flex circuits 26 would limit air flow to the components, possibly causing thermal problems. By running the flex circuits 26 across the HDA cover plate 50 of the drive 18, deleterious component thermal issues are avoided. In a preferred embodiment, the flex circuits 26 are bonded to the HDA cover plate 50

Figure 7:
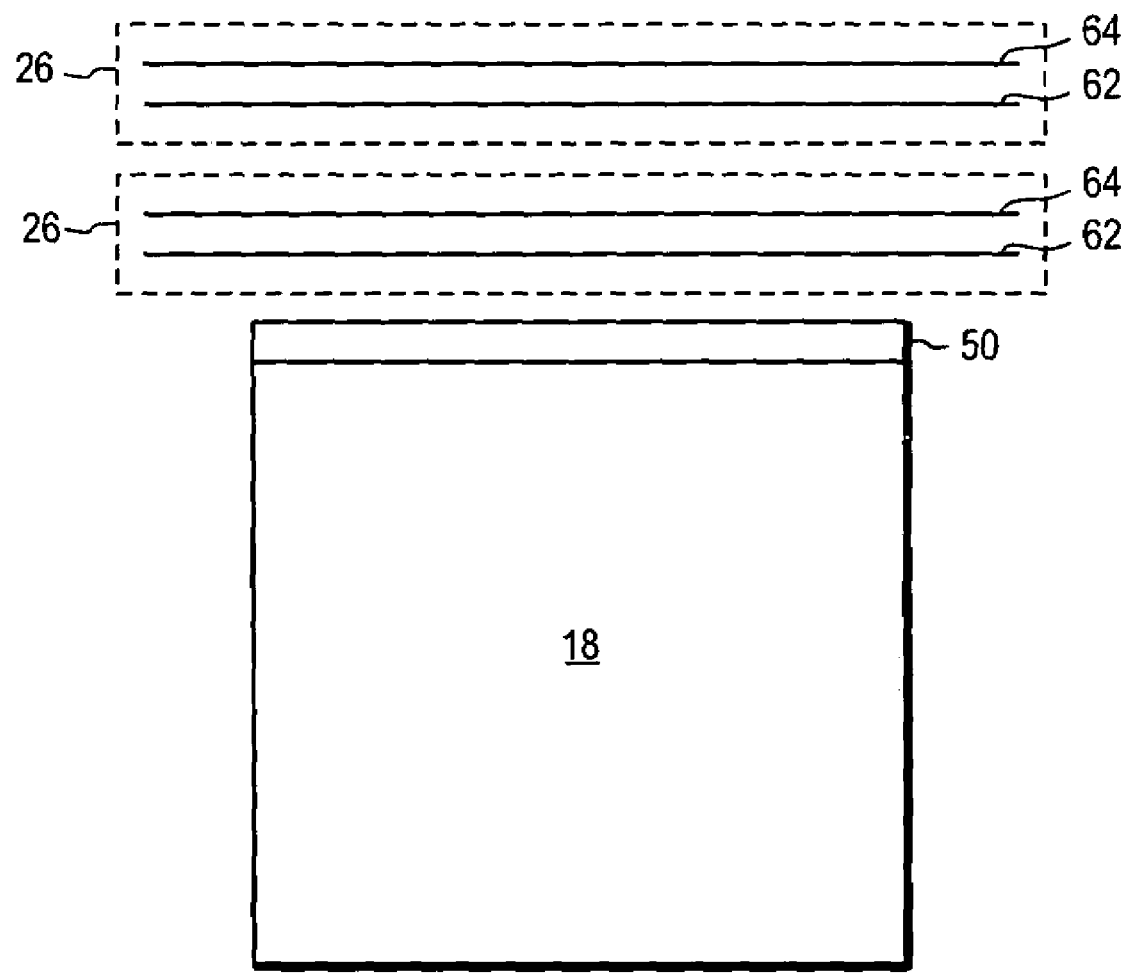
FIG. 7 is a representation showing how two flex circuits and a disk drive EMI shield interact to provide EMI shielding for the signal microstrips in the flex circuit.

Furthermore, the metal HDA cover plate 50 on the disk drive 18 also acts as an EMI shield for the flex cables 26. Referring to FIG. 7, it can be seen that the flex circuit 26 is constructed of two layer PCB. One layer consists of signal microstrips 62, while the other consists of a ground plane 64. The first flex circuit 26 is arranged such that the signal microstrips 62 faces the disk drive HDA cover plate 50. Thus, the signal microstrips 62 are sandwiched between the disk drive HDA cover plate 50 and the ground plane 64 in the flex circuit 26. The second flex cable 26 is arranged such that the signal microstrips 62 face the first flex circuit 26. Thus, the signal microstrips 62 on the second flex circuit 26 are sandwiched between the ground plane in the first flex cable 26 and the ground plane in the second flex cable 26. All the signal microstrips 62 are thereby sandwiched between ground planes, thereby maximizing EMI shielding for the signals.

Figure 8A:
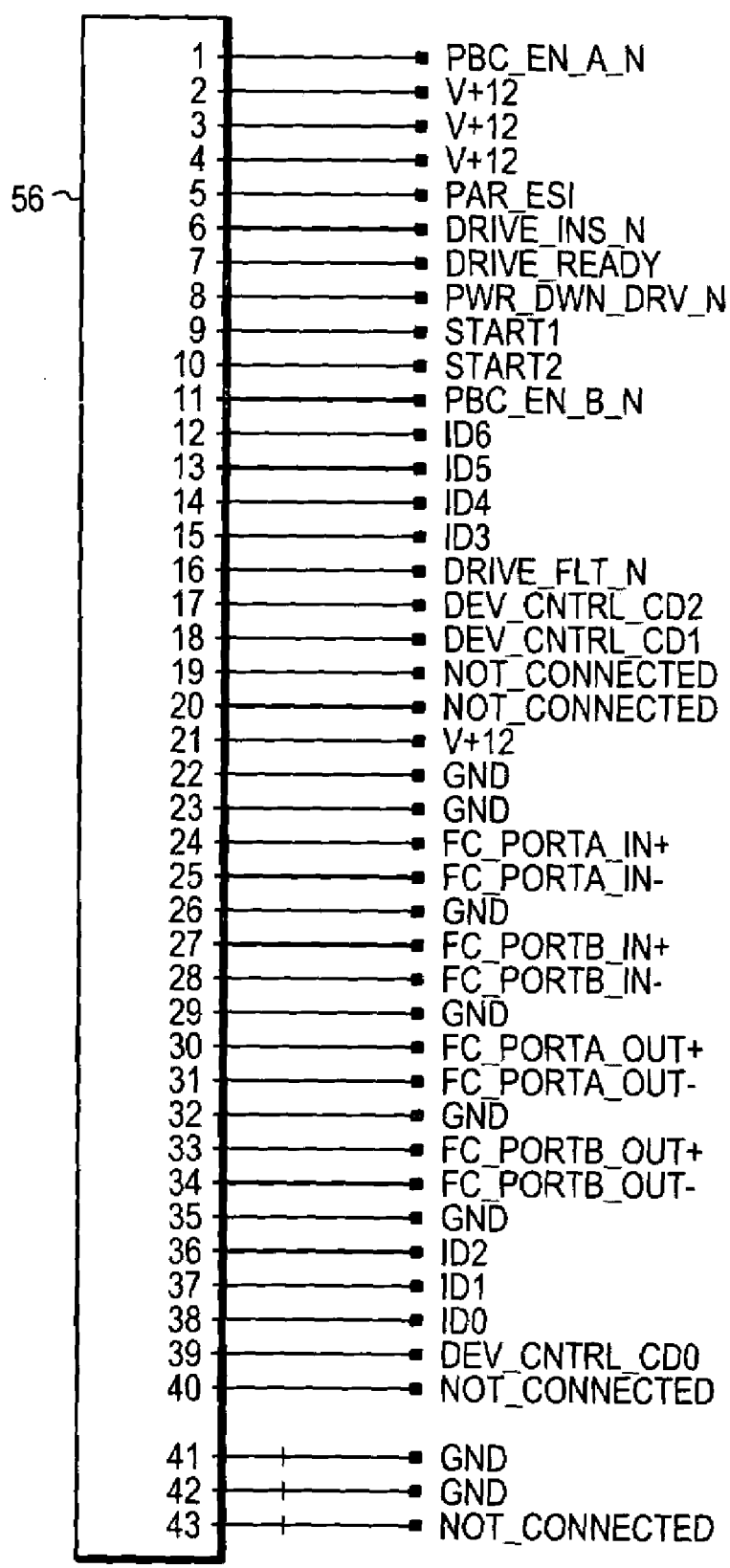
FIGS. 8A and 8B show a flex circuit connector pinout that provides further EMI shielding for the signal microstrips within the flex circuit.
Figure 8B:
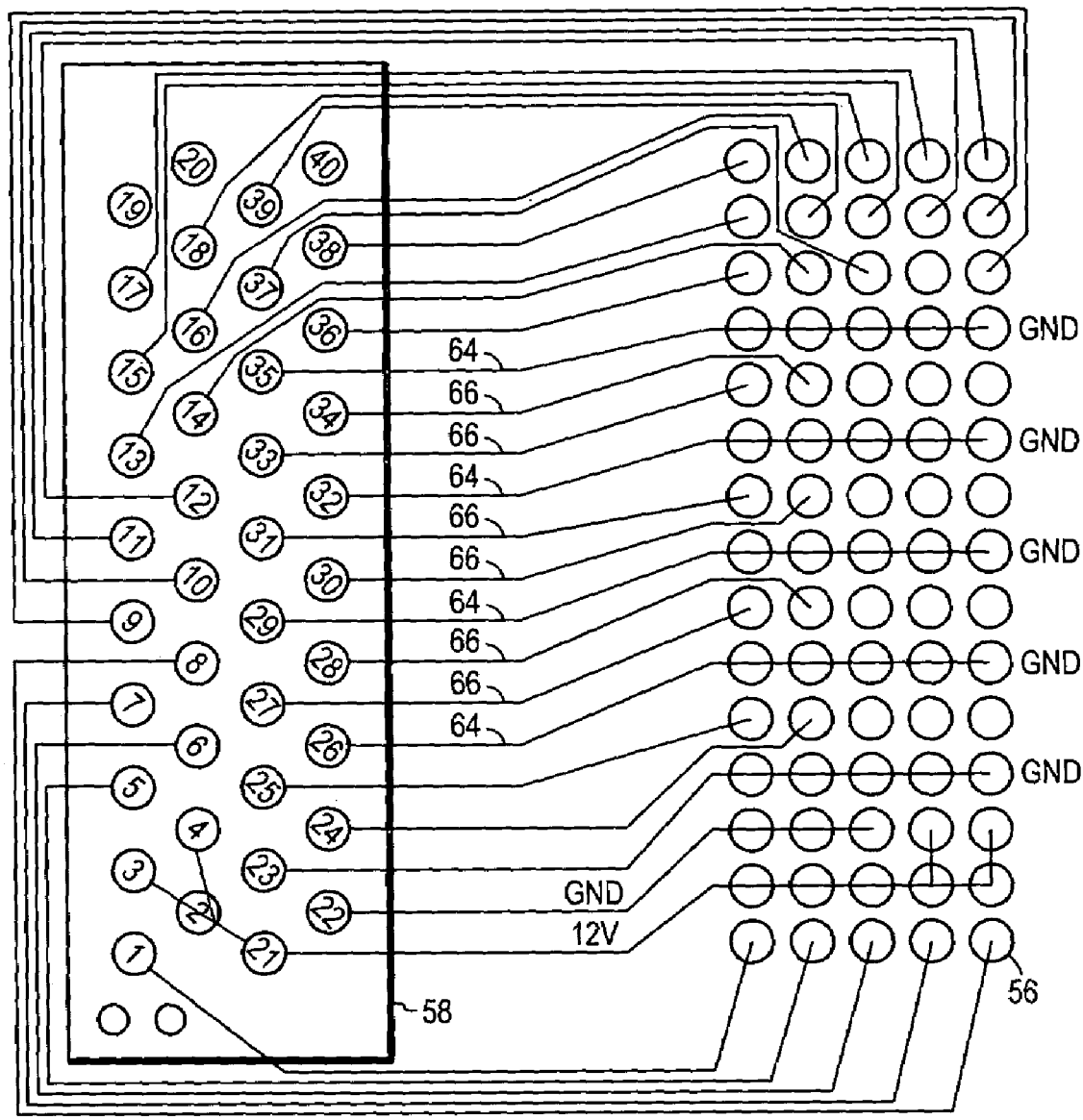

According to a further aspect of the invention, the pinout pattern on the flex circuit connectors help to provide EMI shielding for the high speed differential data signals. Referring to FIG. 8, the LGA stacking connector 56 on the end of the flex circuit 26 that connects to the paddle board 24 is conveniently implemented as an Intercon C-stacker style connector with 75 pins, 5 pins tall by 15 pins wide. The connector 58 on the other end of the flex circuit 26 that attaches to the drive 18 is an SCA2 connector. Shown is one layer of signal microstrips 62. The connector 56 pinout is arranged so that differential pair signals are next to each other and surrounded by ground signals, so that ground microstrips 64 surround the differential pair signal microstrips 66 down the length of the flex circuit 26.

Figure 9:
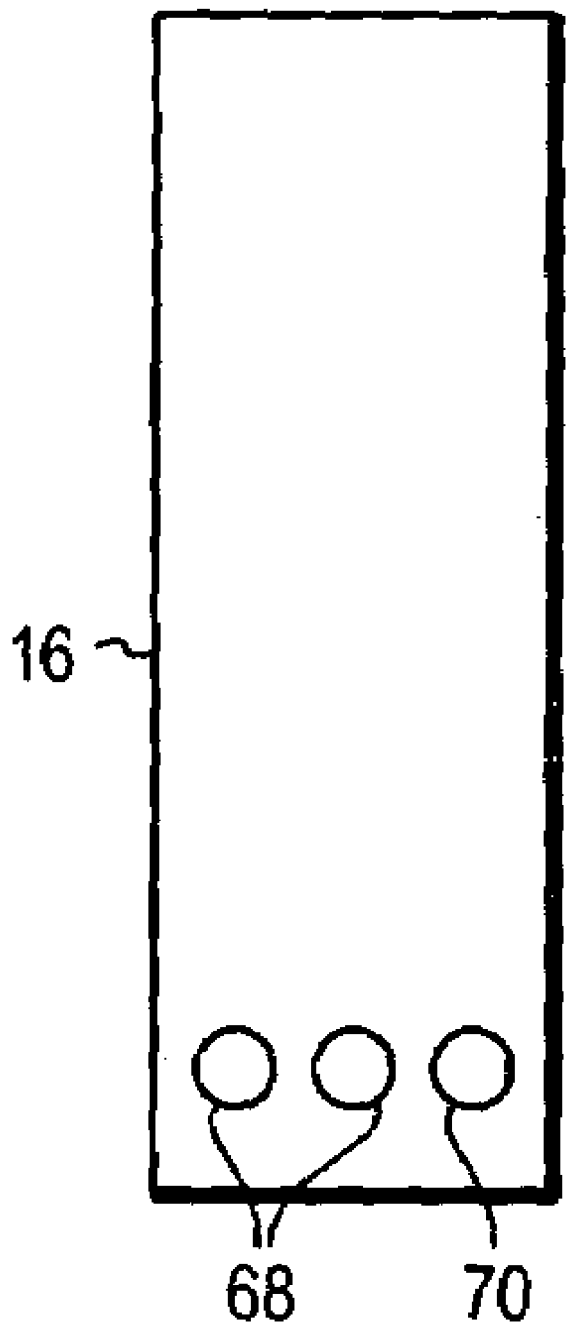
FIG. 9 is a representation of the front of a disk drive carrier, showing the activity and fault LEDs.

According to another aspect of the invention, LED indicators are provided on the carrier to indicate drive activity and drive faults. In currently known systems wherein a carrier includes only one disk drive, one activity LED and one fault LED are provided, so that for each drive, one can tell by looking at the carrier whether the drive is active, and whether the drive has suffered a fault. However, in a system as arranged in accordance with the principles of the invention, a carrier includes at least two disk drives, which might lead a designer to include two activity LEDs and two fault LEDs on the carrier. Counter intuitively, only a single fault LED is a provided. In FIG. 9, the front of the carrier 16 is shown to include two activity LEDs 68 and one fault LED 70. The single fault LED 70 is effective because the carrier including the two disk drives is treated as a single field replaceable unit ("FRU"). That is, when one of the drives 18 or the paddle card 24 in the carrier 16 fails, the entire carrier 16 including both drives 18 is eventually replaced as a single unit. So, a single fault LED 70 is provided to indicate that one of the two drives 18 or the paddle card 24 has failed and that the carrier 16 including both drives 18 should eventually be replaced. By eliminating the need for two LEDs, valuable space on the carrier 16 is conserved, and the cost of the carrier 16 and of the overall system 10 is reduced. Note also that, for the other preferred embodiment wherein the carrier 16 includes six disk drives 18, again only a single fault LED 70 is provided on the carrier 16 for the same reason.

Figure 12:
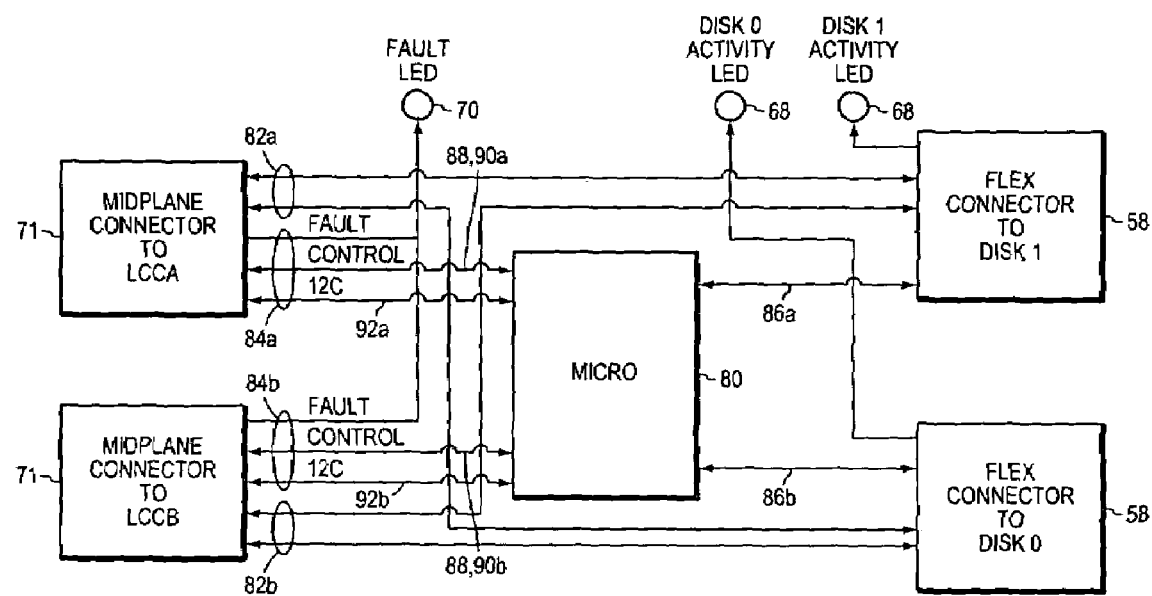
FIG. 12 is a general schematic of the circuit board within the carrier that connects the disk drives to the midplane within the enclosure.
Figure 13:
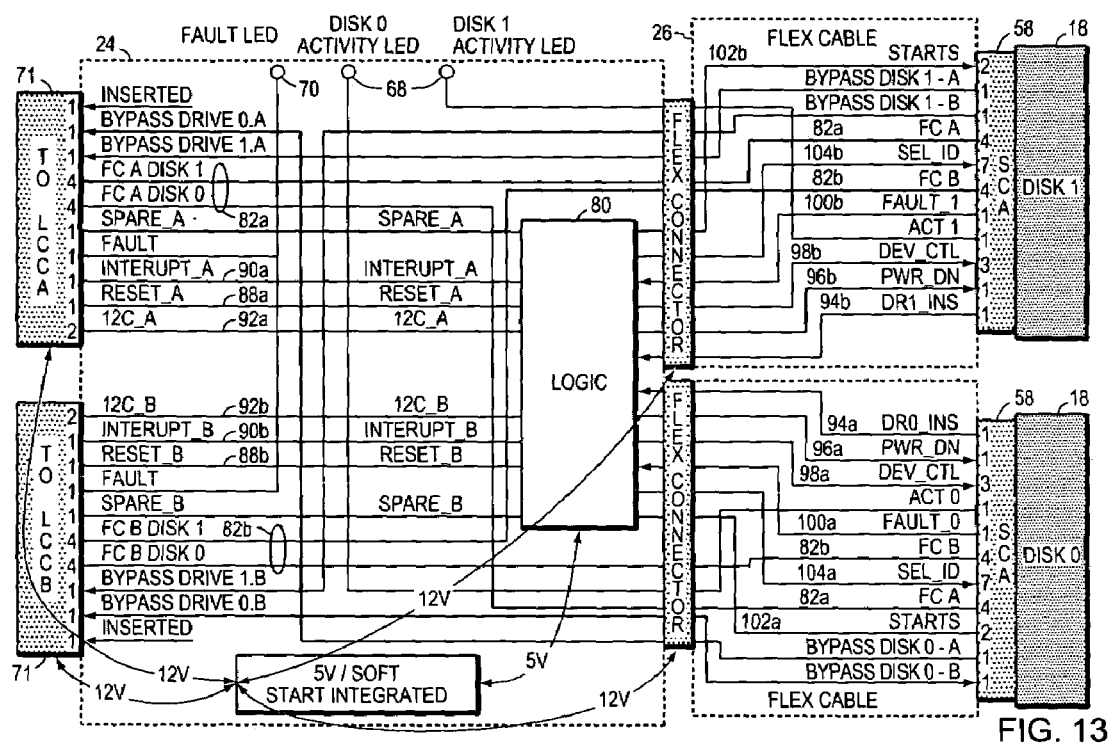
FIG. 13 is a schematic representation of a fibre channel version of the circuit board shown in FIG. 12.
Figure 15:
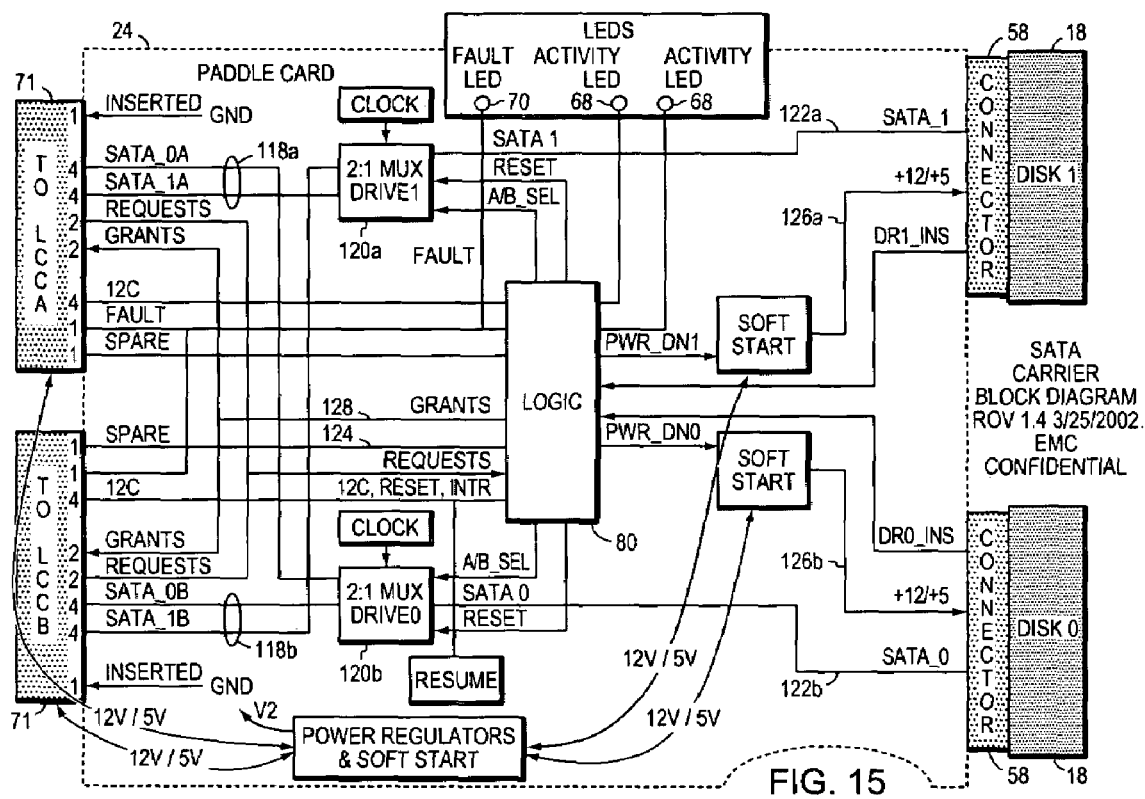
FIG. 15 is a schematic representation of a SATA version of the circuit board shown in FIG. 13.

More particularly, referring to FIGS. 12, 13, and 15, the fault LED 70 and activity LEDS 68 are shown schematically as they connect between the midplane 38 and the drives 18. FIG. 12 shows generally the manner in which the paddle board 24 connects the drives 18 to the midplane 38. FIG. 13 is a more detailed view of the paddle board as it connects FC drives 18 to the midplane 38. FIG. 15 is a more detailed view of the paddle board as it connects SATA drives 18 to the midplane 38. As shown, each activity LED 68 is driven directly by a corresponding drive 18. The fault LED 70 is driven by the LCC 46 onto the paddle board 24 via the midplane connectors 71. A Fault signal 69 feeds a light pipe to light the fault LED 70 on the front of the carrier 16. In the FC configuration shown in FIG. 13, note that each drive 18 has a fault line 100$a,b$ driven to a microcontroller 80. When the microcontroller 80 senses the assertion of the fault line from either drive, it drives one of the interrupt lines Interrupt A,B back across the midplane 38 to the LCCs 46. One of the LCCs 46 asserts the Fault signal 69 in response, causing the fault LED 70 to light. Alternatively, the LCCs 46 can poll the microcontroller 80 to ascertain whether any of the fault line 100$a,b$ signals are asserted. In addition, the LCCs 46 can assert the Fault signal 69 on their own based on information gathered, such as error rates, etc., rather than in response to the Interrupt lines from the microcontroller 80. In fact, in the SATA configuration shown in FIG. 15, the LCCs 46 are responsible for asserting the Fault line 69.

In today's known storage systems, when a disk drive fails, it is replaced immediately. In accordance with another aspect of the invention, the need to replace failed disk drives immediately is eliminated. The invention takes advantage of the density of disk drives in the system. The ability to provide up to 30 3.5 inch drives 18 or up to 90 2.5 inch drives 18 per enclosure 14, and up to 8 enclosures per system 10, results in a very, very large amount of storage space, particularly when similar systems 10 are cascaded together. So, certain installed drives 18 can act as spares. In accordance with the invention, when a disk drive 18 fails, its contents are re-built on one of the spare drives 18, and its replacement is deferred. The invention thus enables the deferral of system maintenance, providing an entirely new service model. Maintenance can now be scheduled in a predictable manner. Furthermore, a maintenance mode can be provided wherein data is de-fragmented to clean up the failed drives 18. Ultimately, as the drives 18 become smaller and cheaper, enough spares are available to provide a maintenance-free system.

Figure 10:
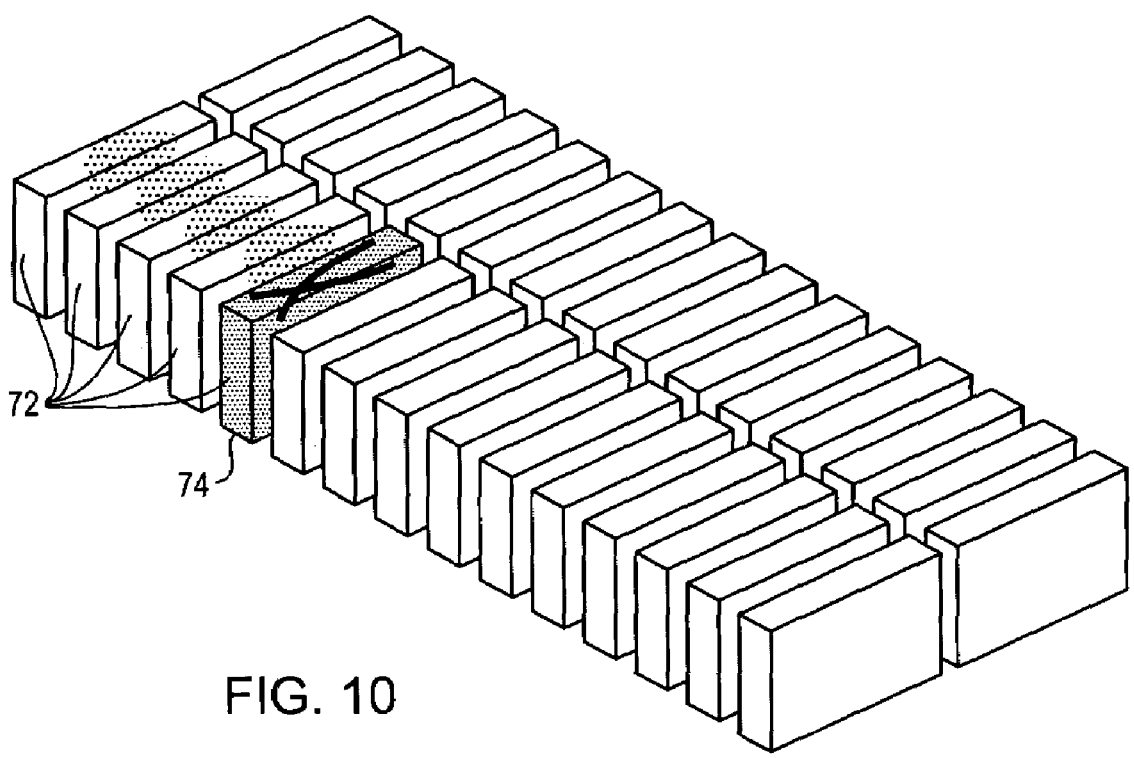
FIG. 10 is a representation of several disk drives forming a LUN.
Figure 11:
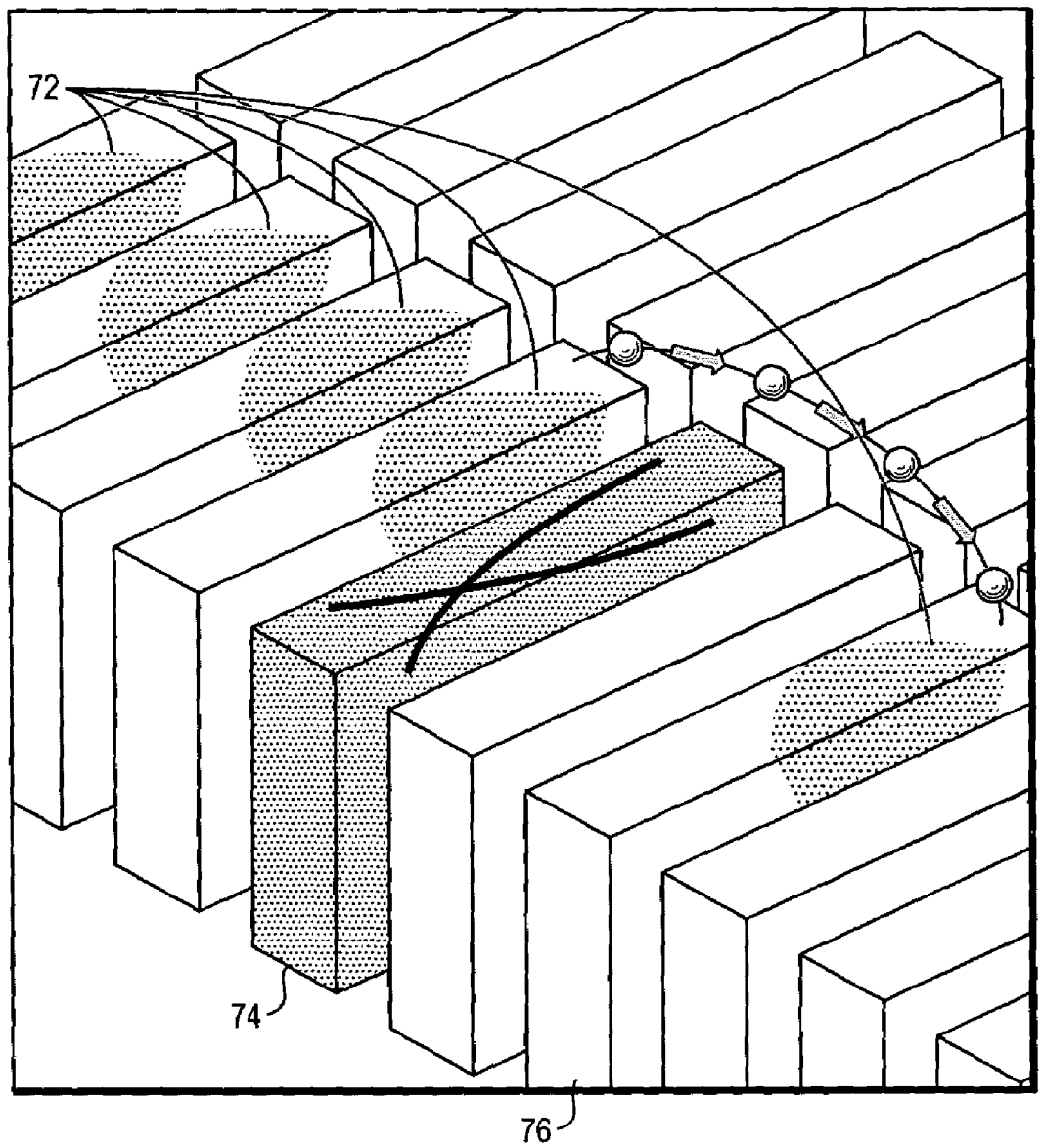
FIG. 11 is a representation of the use of a spare disk drive to repair a LUN.

More particularly, referring to FIG. 10, data is stored across sets of disks 18 herein referred to as logical units ("LUNs"). Data is stored across a LUN in any of a number of known fault tolerant manners, for example RAID 0–10 or parity, so that if a disk drive in a LUN fails, the data contained thereon can be recovered from the remaining disks in the LUN. In the particular implementation shown, a particular LUN 72 consists of five disk drives 18. Data is stored on 4 drives, while parity is stored on a fifth drive. If any of the five drives in the LUN 72 fails, any lost data can be re-built from the data contained on the other four drives. Assume disk drive 74 fails. In this case, as shown in FIG. 11, a spare disk drive 76 is found, and the data from the four operational drives in the LUN 72 is used to rebuild the failed drive 74 onto the spare drive 76. According to a further aspect of the invention, the amount of available spare space is tracked. As spare disk space is used, if the amount of spare space left falls below a threshold, then the system signals that maintenance is required.

In accordance with another aspect of the invention, there are provided mechanisms to allow the storage system architecture to be storage technology agnostic. As was previously mentioned, the drive carrier 16 can contain any type of disk drive 18, for example FC drives or SATA drives, because the signaling provided to the carrier 18 is storage technology agnostic. More particularly, referring to FIG. 12, high speed data signals 82$a,b$ and low speed management signals 84$a,b$ are provided from the two LCCs, across the midplane, to the paddle board 24. A microcontroller 80 on the paddle board 24 converts the low speed management signals 84$a,b$ into storage technology specific management signals 86$a,b$. More specifically, four technology agnostic signals are passed between the microcontroller 80 and each LCC 46—a reset signal 88$a,b$, an interrupt signal 90$a,b$, and two low speed serial bus signals 92$a,b$. The serial bus signals are decoded by the microcontroller 80 and re-encoded into storage technology specific signals 86$a,b$.

According to one implementation, the serial bus signals 92$a,b$ are I2C bus signals. I2C is a well-known serial bus protocol, the operation of which is described in "The I2C-Bus Specification Version 2.1", from Philips Semiconductors. The microcontroller converts the I2C bus signals 92$a,b$ into either fibre channel management signals or SATA management signals, depending upon which type of drives 18 are installed in the carrier 16.

Referring to FIG. 13, the schematic shows the microcontroller 80 on the paddle board 24 as it is connected between the two drives 18 on the carrier 16 and the midplane connectors 56 when the carrier contains FC drives. Each LCC 46 drives, across the midplane 38, two sets of fibre channel data signals 82$a,b$, herein labeled FC A DISK 1, FC A DISK 0, FC B DISK 1, and FC B DISK 0. Each disk drive 18 includes two fibre channel signal interfaces, so the FC A DISK 1 and FC B DISK 1 signals are driven directly to one disk drive, while the FC A DISK 0 and FC B DISK 0 signals are driven directly to the other disk drive. The other disk drive interface signals are coupled to the microcontroller. For the disk drive 18 labeled "Disk 1", these signals include DR1_INS (94$a$) which indicates to the microcontroller 80 that the drive 18 is present; PWR_DN1 (96$a$), which controls power to the drive 18; DEV_CTL_1<2:0>(98$a$), used to control such things as drive speeds and hard reset sequences; FAULT_1 (100$a$), which indicates to the microcontroller 80 that a fault has occurred on the drive 18; STARTS_1<1:0>(102$a$), signals controlling drive power-up; and Sel_ID_1<6:0>(104$a$), used for management and drive addressing. The Bypass 1A/1B signals are driven directly from the drives 18 to the LCCs 46 and provide an indication to the LCCs 46 as to whether the drives 18 are bypassed on the FC-AL. For the disk drive 18 labeled "Disk 0", the same disk drive interface signals are coupled to the microcontroller, the signal names labeled "0" instead of "1", and like reference numbers labeled "b" rather than "a". When referring to like signals for both drives, "X" is used: for example, SEL_ID_X refers to both the SEL_ID_0 AND SEL_ID_1 signals. On the midplane side, the two sets of I2C signals 92$a,b$, the two RESET signals 88$a,b$, and the two INTERRUPT signals 90$a,b$, are connected to the microcontroller, one for each LCC 46.

Fibre Channel systems are often managed in accordance with an industry standard enclosure management protocol known as SFF-8067, described in detail in "SFF-8067 Specification for 40-pin SCA-s Connector w/Bidirectional ESI". This protocol is used primarily in JBOD ("just a bunch of disks") environments, for managing the storage system via the Fibre Channel connection. (SFF-8067 is a follow-on to SFF-8045, thus the implementation described herein is equally applicable to SFF-8045 managed systems.) When SFF-8067 commands are being responded to, disk drives 18 drive the SEL_ID_X<6:0> lines for enclosure management purposes. When SFF-8067 commands are not being issued, the SEL_ID_X<6:0> lines are used to provide disk drive addresses in accordance with the Fibre Channel Arbitrated Loop protocol.

SFF-8067 responses from the drives 18 are decoded by the microcontroller 80 and driven onto the I2C buses 92$a,b$ back to the LCC 46. Other management commands from the LCCs 46 are driven over the I2C busses and decoded by the microcontroller to drive the device control lines DEV_CTL_X<2:0>, the power control line PWR_DN_X, and the STARTS_X control signals.

Figure 14C:
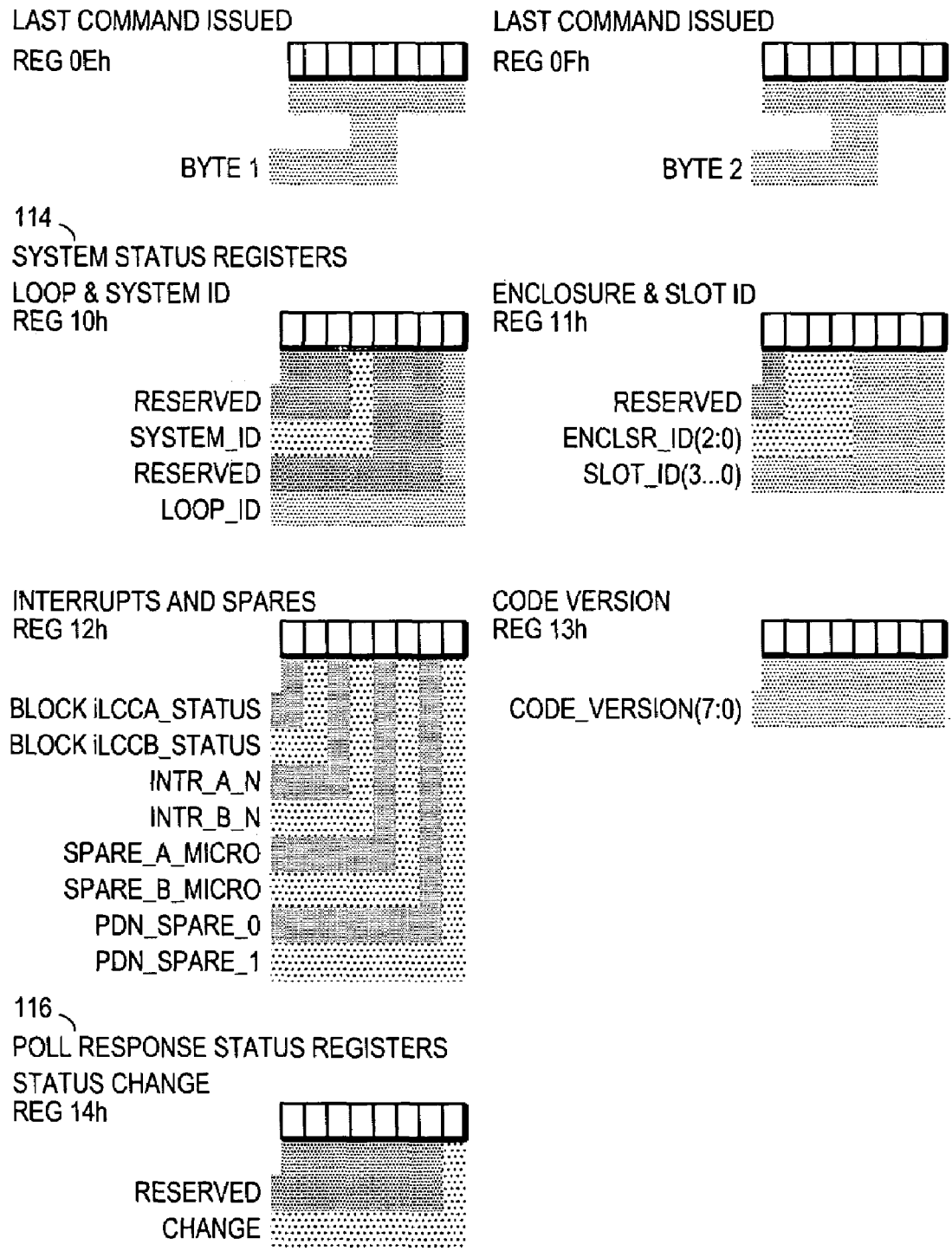

According to one implementation, the LCCs 46 communicate with the microcontroller 80 via command, and status registers. These registers are shown in FIG. 14. After power up, the microcontroller 80 awaits an initialization command from either LCC 46. The initialization command 106 contains a system ID, an enclosure ID, a controller ID, a slot ID, a loop ID, and loop speed. In accordance with an aspect of the invention, this information is decoded by the microcontroller 80 to determine drive spin-up method and to determine drive ALPA addresses. For instance, if the system ID indicates one type of system, the STARTS_X<1:0> are driven to cause the drive motor to spin up. If the system ID indicates another type of system, the STARTS_X<1:0> are driven to cause the drive motor to wait for a SCSI command before spinning up. Alternately, the STARTS_X<1:0> bits may be driven based on enclosure ID. The drive STARTS_X<1:0> are thus under complete software control. The enclosure ID and slot ID together determine the ALPA of the two drives in the carrier 16, so the SEL_ID_X<6:0> lines are asserted accordingly. The loop speed information is used to drive the DEV_CTL_X<2:0> bits to the drives to inform the drives of their speed configuration. Depending on the loop speed information received by the microcontroller 80, the DEV_CTL_X<2:0> bits will be encoded by the microcontroller 80 to indicate that the drives 18 should run at one, two, or four Ghz link rate. Once these drive configurations are complete, the microcontroller 80 awaits other commands from the LCCs 46 and maintains drive status registers.

The command register 108 is shown in FIG. 14. Commands are issued by LCCs 46 to the microcontroller 80 based on an opcode. In the current example, the opcode is a three bit register field. As shown, the opcode is decoded by the microcontroller 80 to drive the PWR_DNX and RESET lines to the drives 18. For example, upon receipt of a command from an LCC with an opcode of 001 and the drive 1 and drive 0 bits set, both PWR_DNX lines are driven to power up both drives. In addition, opcodes can be decoded by the microcontroller 80 to indicate a speed change, in which case the microcontroller drives the DEV_CTL_X<2:0> lines to one or both drives 18 to indicate the new speed. Opcodes can also be decoded to cause the microcontroller to drive the DEV_CTL_X<2:0> lines in a sequence to issue a hard reset to one or both drives 18. Opcodes can further be decoded to cause the microcontroller 80 to "block" one of the LCCs 46. When an LCC 46 is blocked, the microcontroller 80 ignores the inputs from the blocked LCC 46. This command is used for fault tolerant purposes as will be further described. Opcodes can also be issued by the LCCs 46 to cause the microcontroller to read status registers or clear the command register.

The LCCs 46 monitor drive state and command status by reading status registers. There are four types of status registers: drive status registers 110, command status registers 112, system status register 114, and poll response status register 116. As shown, two drive status registers 110 are provided, one per drive 18. The drive status registers latch the state of signals from and to the drives, including: DRX_INS, FAULT_X, PWR_DN_N, STARTS_X<1:0>, DEV_CTL_X<2:0>, and SEL_ID_X<6:0>. Drive status registers can be read by the LCCs 46 to evaluate drive state.

Command status registers 112 are used by the LCCs 46 to check the status of commands issued by either LCC 46 to the microcontroller 80. One command status register 112 contains hard reset command status. Another command status register 112 contains power control command status. When any drive power control related command or drive hard reset command is issued, these registers are updated accordingly. When any of the bits in these registers change, the !CLEARED bit is asserted to indicate a change. In particular, the command status registers encode the following: ISSUED_TO_DRIVE<2:0>, indicating the respective drive that was affected by the command; ISSUED_BY_LCCx, indicating the ID of the LCC that issued the command; COMMAND_SUCCESS, indicating that a legal command was successfully completed; and POWER_STATUS<1:0>, encoding current power state. A last command issued register can be read by an LCC 46 to ascertain the last command sent by either LCC to the microcontroller 80. This is advantageous when one LCC 46 has issued a command, and needs to know if the other LCC 46 has issued a subsequent command.

System status registers 114 encode system information as shown. Some of this information is received by the microcontroller upon initialization by an LCC. The information includes Loop and System ID, Enclosure and Slot ID, Interrupt line status, and code version information.

A poll response status register 116 is provided to indicate whether the contents of any of the previously described status registers has been changed by the microcontroller. An LCC need only poll this bit to see if any status registers have been changed, thus avoiding the need to poll the entire status register bank.

Referring to FIG. 15, the schematic shows the microcontroller 80 on the paddle board 24 as it is connected between the two drives 18 on the carrier 16 and the midplane 38 when the carrier 16 contains SATA drives. In this case, two sets of SATA data signals 118*a,b* are driven from each midplane connector 71, on the same pins that are used for the FC data signals in the FC configuration. However, the SATA disk drive connectors 58 provide only a single set of data signals. So, 2:1 multiplexers 120*a,b* are provided to multiplex the SATA signals from the midplane connectors 71 down to two sets of data signals 122*a,b* one per disk drive 18. 5 and 12 volt power is also provided to the drives 18. The drives indicate their presence to the microcontroller 80 via the DRX_INS signals. The microcontroller 80 monitors the DRX_INS signals and receives Requests from the LCCs 46 on Request lines 124. In response to the requests, the microcontroller 80 drives the PWR_DNX signals to control logic 126*a,b* for providing 5 and 12 volt power to the drives 18 in particular configurations in accordance with the SATA standard. The microcontroller 80 drives Grant signals 128 back to the LCCs 46 to indicate completion of requests.

In accordance with another aspect of the invention, the midplane connector 71 pinout is storage technology agnostic. That is, the same midplane connectors 71 are used to couple the LCCs 46 to the microcontroller 80 and disk drives 18, regardless of whether the disk drives 18 are FC, STA, or SAS compatible. Referring to FIG. 16, the midplane connector 56 pinout is shown for both FC and SATA configurations. Note that in the SATA configuration, the pins used for the Request and Grant lines are used for spares and Bypass signals in the FC configuration.

As previously mentioned, the two LCCs 46 provide redundancy, and therefore high availability, for the enclosure 14. It is important to minimize or eliminate all single points of failure in the storage system 10. Various aspects of the invention contribute to high availability of the I2C buses toward this end.

Figure 17A:
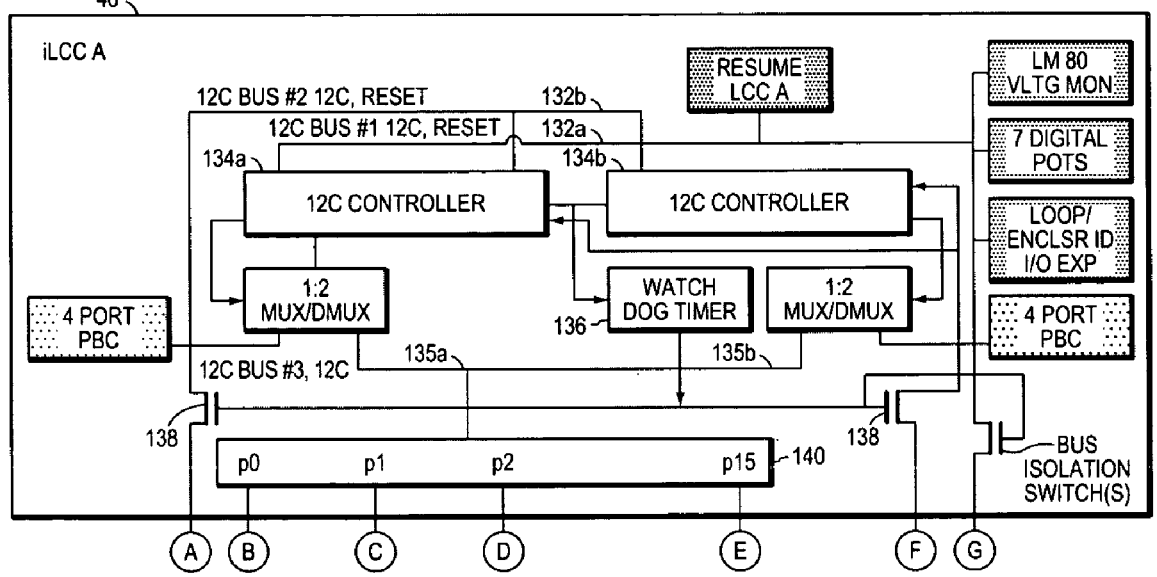
FIG. 17 is a schematic representation of the I2C buses on the link control cards, showing how they are connected to the carriers in the enclosure.
Figure 17B:
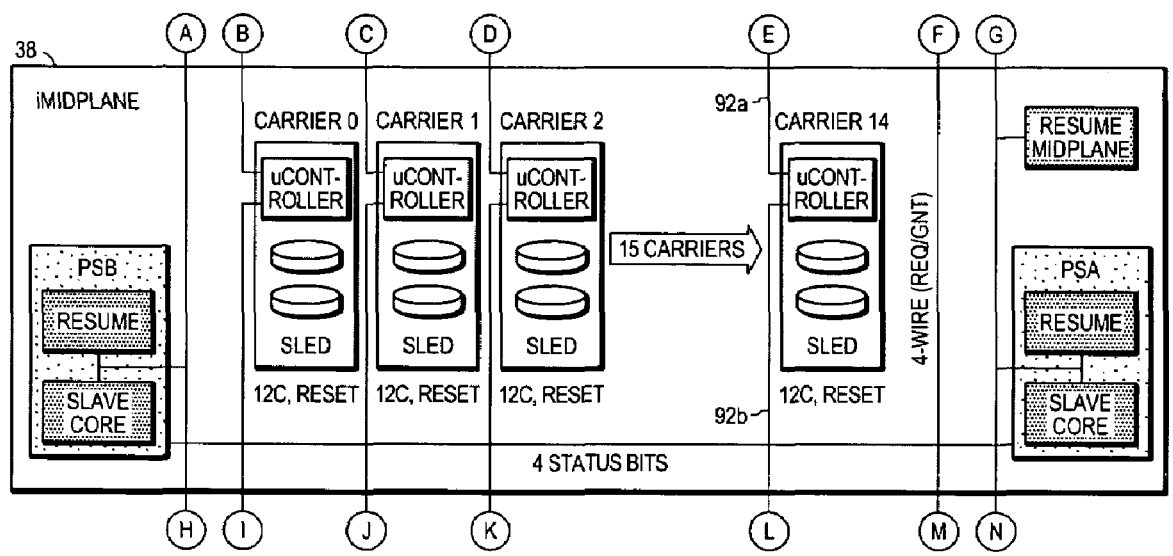
Figure 17C:
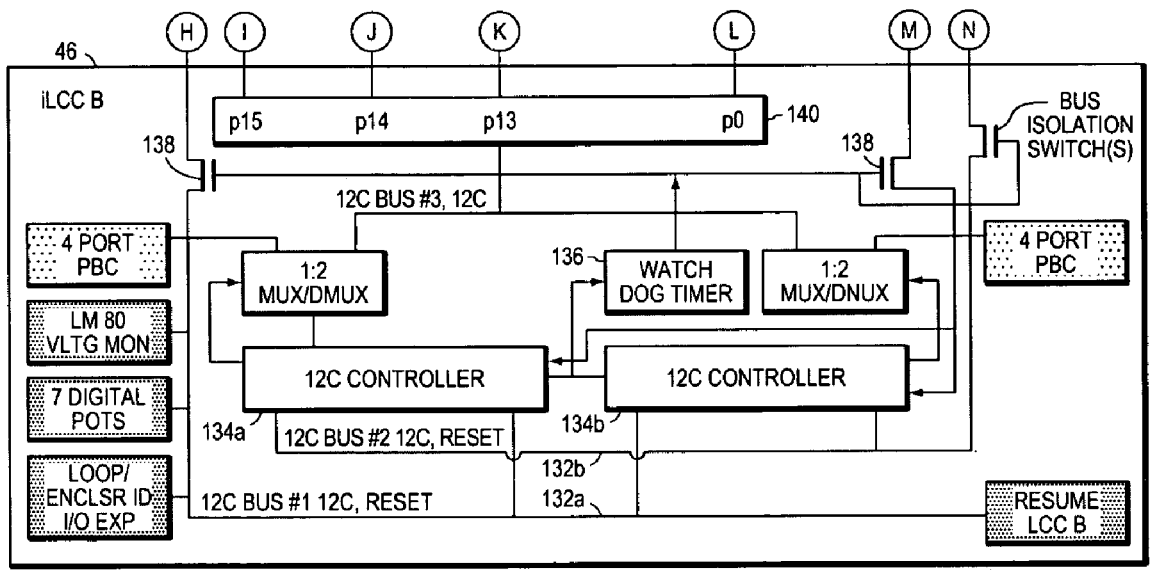

Referring to FIG. 17, the routing of the two I2C buses between the LCCs 46 and the carriers 16 is shown. As can be seen, 15 I2C buses 130 are routed between each LCC 46 across the midplane 38 to each carrier 16, where they interface to the microcontroller 80 on the carrier paddle board 24 as previously described. However, it is impractical and cost ineffective to provide 15 I2C master controllers on each LCC 46 to control each bus. A designer might choose to use one I2C bus and controller on the LCC 46 and demultiplex it into 15 separate I2C buses. This is feasible because an LCC 46 only communicates with one drive 18 at a time. However, if a short or open were to occur on one LCC 46, or on a drive 18, then the other LCC 46 can be brought down. In order to avoid the possibility for this single point of failure, two I2C buses 132*a,b* are provided on each LCC 46, and two master I2C controllers 134*a,b* are provided as well. Thus, if one I2C bus, for example I2C bus 132*a*, malfunctions on one LCC 46, the other LCC 46 can use the other I2C bus 132*b* to remain operational. A watchdog timer 136 monitors activity from the master I2C controllers 134*a, b*. If no activity occurs within a certain amount of time, the watchdog timer trips isolation switches 138 to disconnect the I2C buses 132*a,b* from the midplane 38 and the other LCC 46. In addition, the I2C bus output 135*a,b* from the master controllers 134a,b are input to a 15 port switch 140. Each of the 15 outputs drives one of the I2C buses 92a,b to each carrier 16. Though a demultiplexer could be effectively used, use of a switch 136 instead of a demultiplexer provides improved signal isolation in the event of a bus fault.

Figure 18:
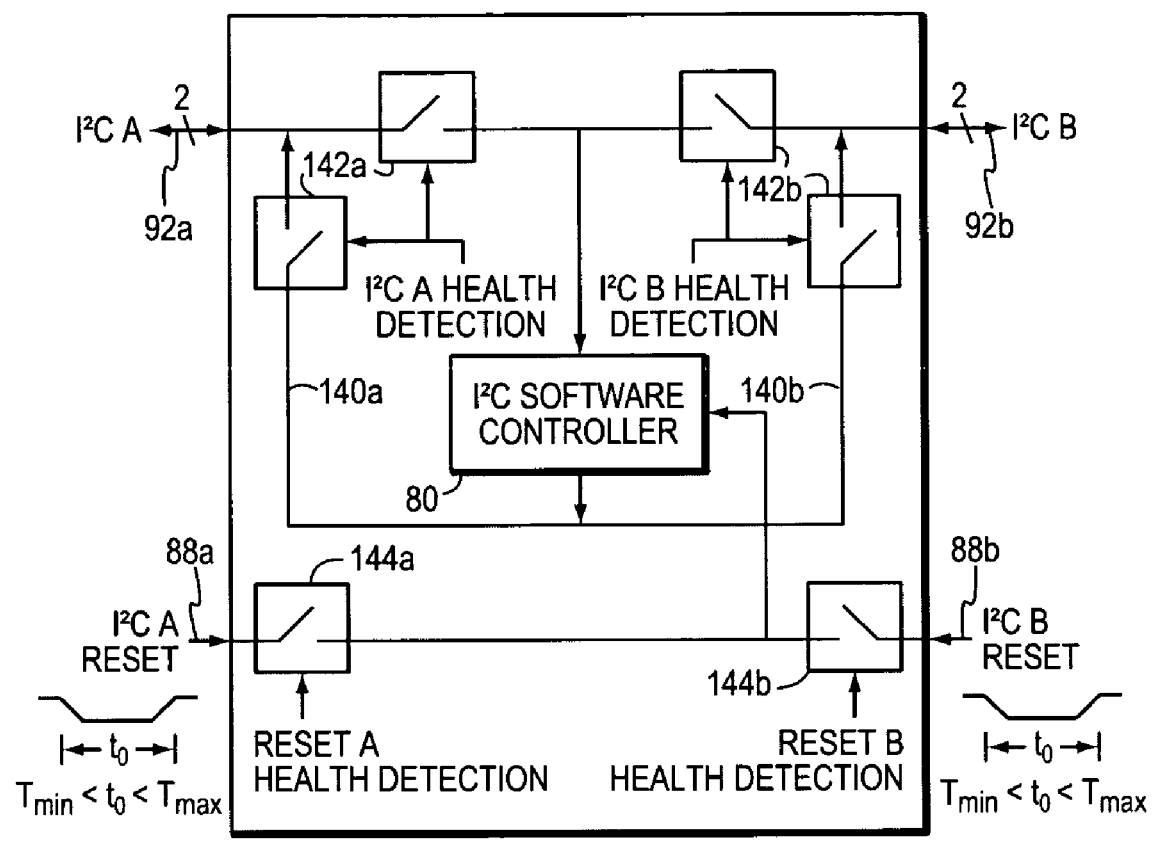
FIG. 18 is a schematic representation of the I2C buses and reset signals on the carrier circuit board.

Referring back to FIG. 12, as was previously described, the microcontroller 80 on the paddle board 24 interfaces to two I2C buses 92a and 92b-one from each LCC 46. Only one I2C bus 92a or 92b is expected to be driven at a time, allowing the use of a single software based slave controller 80. The two I2C buses 92a and 92b are therefore wire-ored together to appear as one I2C bus to the microcontroller 80. Several further steps are taken here to provide high availability. First of all, referring to FIG. 18, the microcontroller 80 monitors the functionality of the two I2C busses 92a and 92b via signal paths 140a and 140b. Isolation switches 142a and 142b are provided on each bus 92a and 92b. If the microcontroller 80 senses that one bus has malfunctioned, the isolation switches for that bus are opened, so that the other bus remains operational. For example, if the microcontroller 80 senses via signal path 140a that I2C bus 92a has malfunctioned, the microcontroller 80 will cause the isolation switches 142a to open, so that the I2C bus 92b remains operational. Secondly, the two reset signals are wire-ored together as well. Isolation switches 144a and 144b are provided on these signals as well. When one of the reset signals is asserted, the microcontroller monitors the length of time that the reset signal is asserted, If the time the signal is asserted exceeds an allowable window, this serves as an indication that the reset signal is wedged. The isolation switch is opened in response, so that the other reset signal remains operational. For example, if Reset signal 88a is wedged, the microcontroller 80 will sense that the Reset signal 88a has been asserted for a time period that exceeds the allowable window, and will in response open the isolation switch 144a to isolate the Reset signal 88a from the Reset signal 88b. The Reset signal 88b thus remains operational. Isolation switches 142a,b and 144a,b could be implemented as components outside the microcontroller 80, or may be implemented within the microcontroller 80.

As previously mentioned, the microcontroller 80 can be programmed by one LCC 46 via a command register 108 to block the other LCC 46. One way this may occur is, if the microcontroller senses that an I2C bus, for example I2C bus 92a, is wedged, the microcontroller will assert the Interrupt line 90b to alert the other LCC 46 of the failure. The properly functioning LCC 46 can then send a command to the microcontroller 80 command register to block the failed LCC 46 from issuing commands to the microcontroller 80. From that point on, the microcontroller 80 will ignore commands from the failed LCC 46 until it receives an unblock command.

Figure 19:
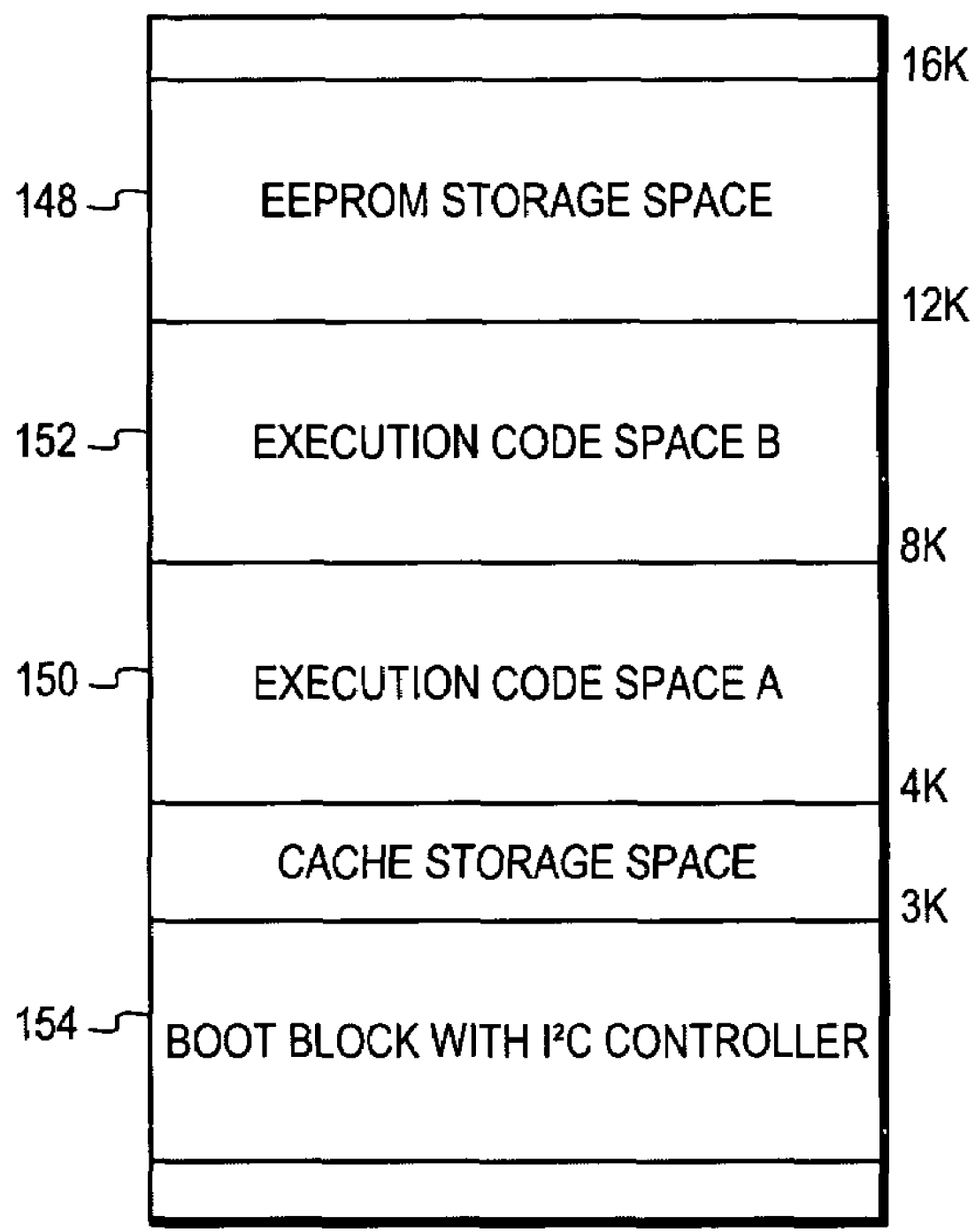
FIG. 19 is a representation of the partitioning of the memory space in the microcontroller on the carrier circuit board.

In accordance with another aspect of the invention, the software microcontroller 80 is taken advantage of to provide further functionality normally provided by separate hardware. Cost and space savings are thereby achieved. In storage systems 10 as shown in FIG. 1, each FRU in the system includes a persistent memory (NVRAM) device herein referred to as a Resume PROM. The Resume PROM could be a Non-Volatile Random Access Memory (NVRAM), a disk device, a flash EEPROM, or any type of media that does not lose data while powered down. The persistent memory stores characteristic data that is considered to be critical to operation and/or maintenance of the FRU and the storage system 10. Because a software microcontroller 80 is used on the carrier as an I2C controller, it can be configured such that part of its flash memory space can serve as the Resume PROM. Referring to FIG. 19, there is shown the memory space as partitioned within the microcontroller, wherein the top 4K (148) serves as the Resume PROM. Of course, the partitioning can change depending upon design constraints, without departing from the principles of the invention.

Furthermore, two separate execution code spaces (150, 152) are provided within the software microcontroller. This is advantageous when upgrading the executable code. A running copy of the execution code can reside in one execution space, while an upgraded copy can reside in the other execution space. The latest version of code can be identified in a boot block. Upgrades can then be performed by simply switching between executable spaces on the fly. Furthermore, an executable could be provided to update the boot block area (154) of the microcontroller.

The present invention is not to be limited in scope by the specific embodiments described herein. Indeed, various modifications of the present invention, in addition to those described herein, will be apparent to those of ordinary skill in the art from the foregoing description and accompanying drawings. Further, although the present invention has been described herein in the context of a particular implementation in a particular environment for a particular purpose, those of ordinary skill in the art will recognize that its usefulness is not limited thereto and that the present invention can be beneficially implemented in any number of environments for any number of purposes.

We claim:

1. Apparatus comprising:
a first link control card coupled to a plurality of disk drive carriers;
a second link control card coupled to the plurality of disk drive carriers;
a first plurality of serial buses on the first link control card, the first plurality of serial buses being input to a first plurality of serial bus controllers, the first plurality of serial bus controllers producing as output a first plurality of output serial buses, the first plurality of output serial buses being input to a first switch, the first switch producing as output a first LCC serial bus;
a second plurality of serial buses on the second link control card, the second plurality of serial buses being input to a second plurality of serial bus controllers, the second plurality of serial bus controllers producing as output a second plurality of output serial buses, the second plurality of output serial buses being input to a second switch, the second switch producing as output a second LCC serial bus;
the first and second LCC serial buses being coupled to a serial bus controller on each disk drive carrier;
the serial bus controller producing an output comprising storage technology specific management signals for managing disk drives;
wherein:
the first switch includes (i) multiple serial bus controller ports configured to connect to the output serial buses produced by the first plurality of serial bus controllers, and (ii) multiple LCC serial bus ports, each LCC serial bus port of the first switch being configured to connect to a respective LCC serial bus coupled to a serial bus controller on a disk drive carrier;
the first switch is configured to perform switching operations on communications from the first plurality of output serial buses to direct each communication specifically to a particular disk drive carrier through a particular LCC serial bus based on a first de-multiplex command;

the second switch includes (i) multiple serial bus controller ports configured to connect to the output serial buses produced by the second plurality of serial bus controllers, and (ii) multiple LCC serial bus ports, each LCC serial bus port of the second switch being configured to connect to a respective LCC serial bus coupled to a serial bus controller on a disk drive carrier; and the second switch is configured to perform switching operations on communications from the second plurality of output serial buses to direct each communication specifically to a particular disk drive carrier through a particular LCC serial bus based on a second de-multiplex command.

2. Apparatus comprising:

a link control card for coupling to a plurality of disk drive carriers;

a plurality of serial buses on the link control card (LCC), the plurality of serial buses being input to a plurality of serial bus controllers, the plurality of serial bus controllers producing as output a plurality of output serial buses, the plurality of output serial buses being input to a switch, the switch producing as output an LCC serial bus;

the LCC serial bus for coupling to a carrier serial bus controller on each disk drive carrier, the carrier serial bus controller producing an output comprising storage technology specific management signals for managing disk drives;

wherein:

the switch includes (i) multiple serial bus controller ports configured to connect to the output serial buses produced by the plurality of serial bus controllers, and (ii) multiple LCC serial bus ports, each LCC serial bus port of the switch being configured to connect to a respective LCC serial bus coupled to a serial bus controller on a disk drive carrier; and the switch is configured to perform switching operations on communications from the plurality of output serial buses to direct each communication specifically to a particular disk drive carrier through a particular LCC serial bus based on a de-multiplex command.

3. A method comprising the steps of:

coupling a first link control card to a plurality of disk drive carriers, the first link control card including a first plurality of serial buses, the first plurality of serial buses being input to a first plurality of serial bus controllers, the first plurality of serial bus controllers producing as output a first plurality of output serial buses, the first plurality of output serial buses being input to a first switch, the first switch producing as output a first LCC serial bus;

coupling a second link control card to the plurality of disk drive carriers; the second link control card including a second plurality of serial buses, the second plurality of serial buses being input to a second plurality of serial bus controllers, the second plurality of serial bus controllers producing as output a second plurality of output serial buses, the second plurality of output serial buses being input to a second switch, the second switch producing as output a second LCC serial bus;

coupling the first and second LCC serial buses to a software serial bus controller on each disk drive carrier;

translating by the software serial bus controller storage technology specific management signals for managing disk drives into signals for transfer over the first and second output LCC serial buses;

wherein:

the first switch includes (i) multiple serial bus controller ports configured to connect to the output serial buses produced by the first plurality of serial bus controllers, and (ii) multiple LCC serial bus ports, each LCC serial bus port of the first switch being configured to connect to a respective LCC serial bus coupled to a serial bus controller on a disk drive carrier;

the first switch is configured to perform switching operations on communications from the first plurality of output serial buses to direct each communication specifically to a particular disk drive carrier through a particular LCC serial bus based on a first de-multiplex command;

the second switch includes (i) multiple serial bus controller ports configured to connect to the output serial buses produced by the second plurality of serial bus controllers, and (ii) multiple LCC serial bus ports, each LCC serial bus port of the second switch being configured to connect to a respective LCC serial bus coupled to a serial bus controller on a disk drive carrier; and the second switch is configured to perform switching operations on communications from the second plurality of output serial buses to direct each communication specifically to a particular disk drive carrier through a particular LCC serial bus based on a second de-multiplex command.

4. A method comprising the steps of:

coupling a link control card to a plurality of disk drive carriers, the link control card including a plurality of serial buses, the plurality of serial buses being input to a plurality of serial bus controllers, the plurality of serial bus controllers producing as output a plurality of output serial buses, the plurality of output serial buses being input to a switch, the switch producing as output an LCC serial bus;

coupling the LCC serial bus to a carrier serial bus controller on each disk drive carrier, the carrier serial bus controller translating storage technology specific management signals for managing disk drives into signals for transfer over the LCC serial bus;

wherein:

the switch includes (i) multiple serial bus controller ports configured to connect to the output serial buses produced by the plurality of serial bus controllers, and (ii) multiple LCC serial bus ports, each LCC serial bus port of the switch being configured to connect to a respective LCC serial bus coupled to a serial bus controller on a disk drive carrier; and the switch is configured to perform switching operations on communications from the plurality of output serial buses to direct each communication specifically to a particular disk drive carrier through a particular LCC serial bus based on a de-multiplex command.

* * * * *